(12) United States Patent
Brutoco et al.

(10) Patent No.: US 11,396,356 B2
(45) Date of Patent: *Jul. 26, 2022

(54) METHOD AND APPARATUS FOR LIGHTER-THAN-AIR AIRSHIP WITH IMPROVED STRUCTURE AND DELIVERY SYSTEM

(71) Applicant: H2 Clipper, Inc., Santa Barbara, CA (US)

(72) Inventors: Rinaldo S. Brutoco, Santa Barbara, CA (US); Robert H. Shelton, Santa Barbara, CA (US); Shawn Merritt, Redondo Beach, CA (US)

(73) Assignee: H2 Clipper, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,168

(22) Filed: Jun. 17, 2021

(65) Prior Publication Data

US 2022/0063790 A1 Mar. 3, 2022

Related U.S. Application Data

(63) Continuation of application No. 17/005,628, filed on Aug. 28, 2020, now Pat. No. 11,066,145.

(51) Int. Cl.
*B64B 1/08* (2006.01)
*B64B 1/14* (2006.01)
*B64C 39/02* (2006.01)

(52) U.S. Cl.
CPC ............... *B64B 1/08* (2013.01); *B64B 1/14* (2013.01); *B64C 39/024* (2013.01);
(Continued)

(58) Field of Classification Search
CPC ............... B64B 1/08; B64B 1/14; B64B 1/18
See application file for complete search history.

(56) References Cited

U.S. PATENT DOCUMENTS

| | | | |
|---|---|---|---|
| 1,724,890 A | 8/1929 | Upson | |
| 3,129,911 A | 4/1964 | Fitzpatrick | |

(Continued)

FOREIGN PATENT DOCUMENTS

DE 102011080709 A1 2/2013

OTHER PUBLICATIONS

International Search Report and Written Opinion in corresponding application No. PCT/US20/48340.
(Continued)

*Primary Examiner* — Brian M O'Hara
(74) *Attorney, Agent, or Firm* — Withers Bergman LLP; John C. Serio

(57) ABSTRACT

A lighter-than-air airship has an exoskeleton constructed of spokes and hubs to create a set of connected hexagrams comprised of isosceles triangles wherein the spokes flex and vary in length to produce the slope of said airship's surface. In one embodiment, the exoskeleton connects to a nose cone that includes a cockpit cabin for controlling the airship's operation from a single location that can be physically separated from the exoskeleton in response to catastrophic events and for autonomous and/or remotely piloted operation. An improved means is also provided for landing and unloading cargo, and through use of unmanned aerial vehicles in another embodiment, the airship is configured for remote pickup, transport, delivery and return of payloads such as packages. In yet another embodiment, the airship provides a communications platform for beam form transmission and satellite signal relay, including in combination with the foregoing disclosed attributes.

57 Claims, 10 Drawing Sheets

(52) U.S. Cl.
CPC .. *B64C 2201/022* (2013.01); *B64C 2201/101* (2013.01); *B64C 2201/122* (2013.01); *B64C 2201/123* (2013.01); *B64C 2201/127* (2013.01); *B64C 2201/141* (2013.01); *B64C 2201/182* (2013.01)

(56) References Cited

U.S. PATENT DOCUMENTS

| | | |
|---|---|---|
| 5,431,359 A | 7/1995 | Belie |
| 5,823,468 A | 10/1998 | Bothe |
| 9,266,597 B1 * | 2/2016 | Pasternak ................ B64B 1/06 |
| 2002/0005457 A1 | 1/2002 | Lee et al. |
| 2014/0124625 A1 | 5/2014 | Brutoco |
| 2016/0105806 A1 | 4/2016 | Noerpel et al. |
| 2019/0152592 A1 * | 5/2019 | Harper .................... B64C 27/20 |

OTHER PUBLICATIONS

M. Sonstegaard, "Airships for transporting highly volatile commodities," Proceedings of the Interagency Workshop on Lighter than Air Vehicles, NASA-CR-137800, pp. 551-562, Doc ID 19760007973, Jan. 1, 1975: https://ntrs.nasa.gov/citations/19760007973.

* cited by examiner

A - A of FIG. 5

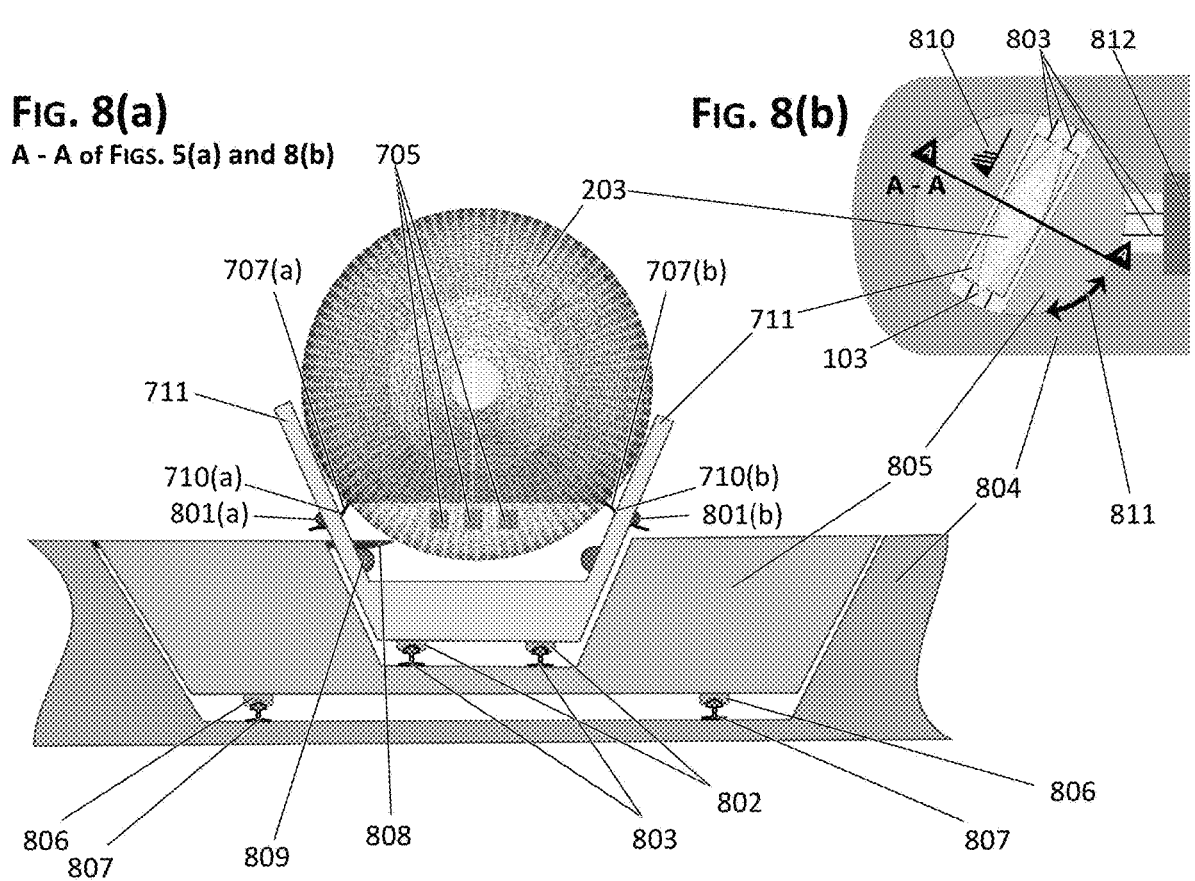

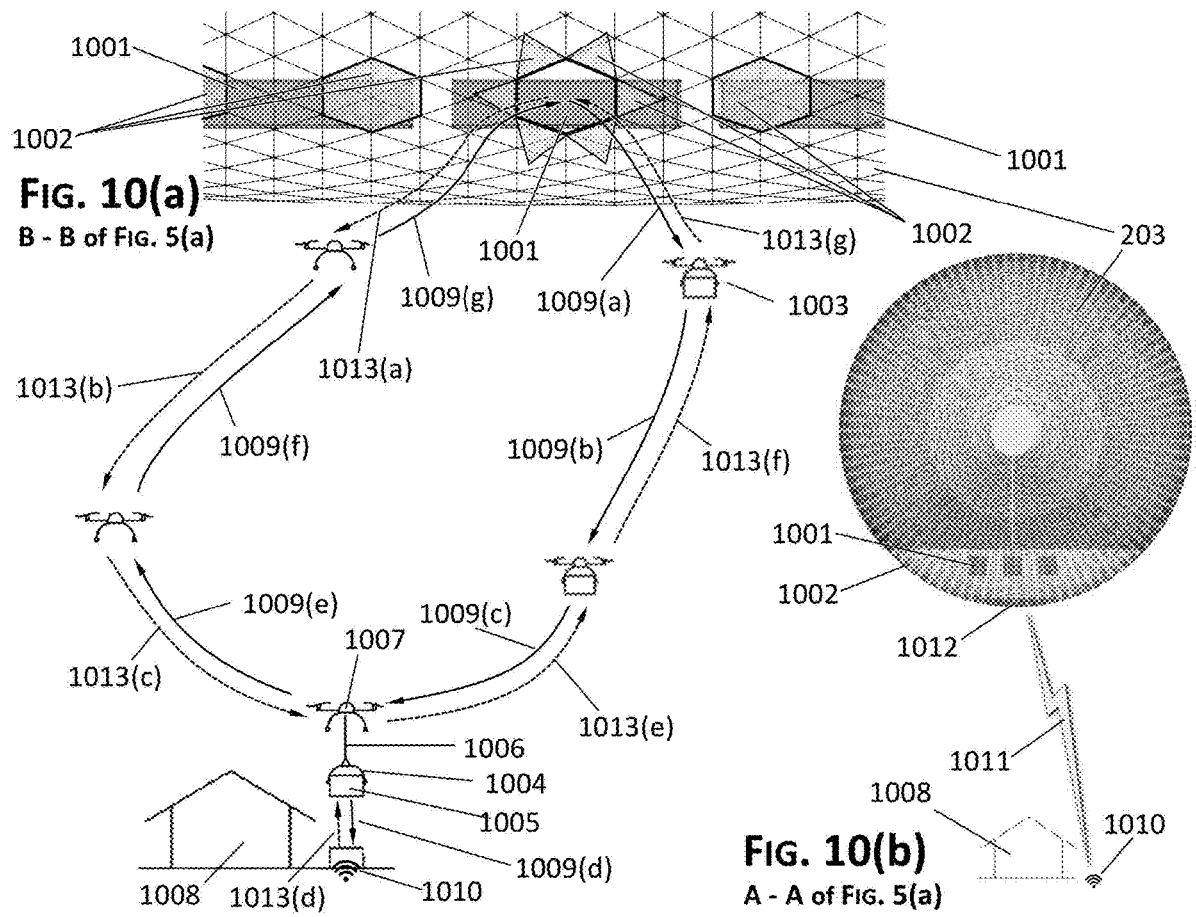

METHOD AND APPARATUS FOR LIGHTER-THAN-AIR AIRSHIP WITH IMPROVED STRUCTURE AND DELIVERY SYSTEM

RELATED APPLICATION

This application is a continuation of U.S. application Ser. No. 17/005,628, filed Aug. 28, 2020. The entire teachings of the above application are incorporated herein by reference.

BACKGROUND

Technical Field of the Subject Technology

The subject technology relates generally to the fields of lighter-than-air airship design, transportation of payloads, and beam form transmission and signal relay. The subject technology includes an airship incorporating an improved structural design and systems, methods and apparatus for operating said airship from a single location that can be physically separated in response to a catastrophic event, or when autonomous or remotely piloted operation is desired. An improved means is also provided for landing and unloading cargo, and through use of unmanned aerial vehicles (UAVs) in another one preferred embodiment, such airship is specially designed to efficiently pick up, transport, deliver and effect the return of payloads from a remote point of origin to where such payloads are desired, alternatively serving as a communications platform for beam form transmission and signal relay, or a combination of these uses. The disclosure has particular utility for picking up, transporting and delivering package goods manufactured in remote locations to individual consumer locations such as personal residences and offices, and will be described in connection with such utility; although other utilities, including mining, other commercial and military utilities are contemplated.

Description of the Prior Art

Lighter-than-air airships are well known in the art. A rigid or semi-rigid airship or dirigible is a steerable airship with a structural framework that maintains the shape of the airship and carries its structural loads, and with the lift provided by inflating one or multiple interior bags or compartments with a lighter-than-air gas such as hydrogen or helium. Historically, such airships have employed a keel similar to that of a boat, which acted as a sort of spine that, in conjunction with interior cables and/or trusses, helped to maintain the airship's shape and supported a gondola and engines. As an improvement over this historical approach, Applicant's earlier patent application Ser. No. 13/855,923, filed on Apr. 3, 2013, now U.S. Pat. No. 9,102,391 (the '391 patent) disclosed, among other things, an exoskeleton comprised of equilateral triangles formed by equal length spokes and equal sized hubs with six spokes terminating at each hub forming a set of hexagons. This set of connected hexagons—each comprised of six equilateral triangles—formed the 3-dimensional shape of the airship by allowing various spokes to flex to different radii. Applicant's subsequent patent application Ser. No. 15/351,759, filed Nov. 15, 2016, now U.S. Pat. No. 10,308,340 (the '340 patent), disclosed among other things, attaching a plurality of solar cells to the surface of the airship to produce electrical energy for various purposes; and Applicant's further patent application Ser. No. 15/962,475, filed on Apr. 25, 2018, now U.S. Pat. No. 10,589,969 (the '969 patent), disclosed among other things, a system and method for transporting, loading and unloading freight from the hull of an airship using a transport vehicle, crane or rail. Applicant's earlier patent application Ser. No. 12/290,453, filed on Oct. 29, 2008, now U.S. Pat. No. 8,336,810 (the '810 patent) disclosed a system and method for using the airship to transport green hydrogen from locations where it was most economic to produce to locations where it was most needed and, among other things, a proprietary docking system for an airship comprising a single launched projectile and landing site line-receiving device adapted to receive and tether the airship to a pole higher than at least half the diameter of the airship that can be equipped with a gimble on its top, thereby enabling it to swivel to any angle.

These previously issued patents, along with other prior art, describe the need for developing an improved method for transporting hydrogen gas and alternative payloads from locations where these are produced to locations where there is a market demand. As noted above, Applicant's '391 patent describes an airship exoskeleton constructed of equal length spokes and identical hubs, with such equal length spokes terminating at each hub to form a set of hexagrams. However, such earlier design of connected hexagrams comprised of equilateral triangles based on equal length spokes to form the three-dimensional shape is limiting and, without modification, cannot sufficiently accommodate the slope and circumference changes of the three-dimensional shape of airship 101 merely by allowing various spokes to flex to different radii. Similarly, Applicant's earlier disclosures are extended and improved through the instant disclosure.

Two of the best-known dirigibles are the Graf Zeppelin and the Hindenburg. The Graf Zeppelin operated commercially from 1928 to 1937, making 590 flights including 144 ocean crossings and traveling over one million miles without incident. Nevertheless, based on the 1937 Hindenburg disaster, the most commonly cited concern regarding an airship initiative, and particularly one that may seek to use hydrogen as a lifting gas, is safety. Various aspects of the subject technology directly enhance the safety of an airship and, among other things, are necessary to overcome longstanding problems in the prior art including but not limited to cargo-offloading without the airship becoming too light for save operation.

However, from a commercial perspective, various other issues have precluded airships from competing successfully with conventional aircraft, trains and ships, including the disproportionately larger number of crew members required to operate such airships for a given payload of freight or passengers they are able to accommodate; failures in the structural integrity of the airships, particularly in certain adverse weather conditions; and the high cost and reduced lifting capacity when seeking to use helium as a lifting gas. Applicant's earlier patent applications provide improved systems and methods that seek to overcome such limitations of the prior art, including through employing geodesic design principles in the exoskeleton to produce greater structural integrity with reduced weight, providing superior aerodynamic characteristics, and enabling faster cruising speeds.

Several prior art disclosures have proposed appending oversized gondola-like structures as a cargo compartment below a conventional airship and utilizing such appended structures to store goods and launch autonomous aerial vehicles (UAVs) for item delivery. These proposals of the prior art include, among others, Amazon Technologies, Inc.'s disclosure of an airborne fulfillment center utilizing UAVs for item delivery, disclosed in application Ser. No.

14/580,046, filed on Dec. 22, 2014, now U.S. Pat. No. 9,305,280 (the '280 patent); and Walmart Apollo LLC's application Ser. No. 15/427,277, filed on Feb. 8, 2017, claiming benefit from Provisional Application No. 62/294,748, filed on Feb. 12, 2016, on a fulfillment center utilizing unmanned aircraft systems (UASs) for item delivery, now U.S. Pat. No. 10,647,402 (the '402 patent).

Fundamentally, such disclosures of the prior art seek to benefit from a number of well-known characteristics of lighter-than-air airships, and in particular the "free lift" provided by the lower density than ambient air of a lighter-than-air gas such as hydrogen or helium; the prospect for remaining in a relatively geo-synchronous location for extended periods, if so desired; and the capability to perform vertical take-off and landing (VTOL), thereby enabling such airships to fly their payload from a point of origin such as a factory in a remote location directly to a distribution center (and through UAVs or UASs, directly to a final destination such as a plurality of personal residences and businesses). Persons of ordinary skill will recognize that such attributes result in the potential for airships to avoid exceedingly crowded and inefficient port facilities, airports and the need for multiple intermodal transfers, handling steps and ground-based facilities; and thereby the prospect of minimizing delays and reducing costs to the extent that an airship can overcome the problems of the prior art.

SUMMARY OF THE SUBJECT TECHNOLOGY

In at least one aspect, the subject technology relates to an airship containing a lighter-than-air gas. The airship includes an exoskeleton defined by a plurality of spokes of varying length and a plurality of hubs, each spoke coupled, at opposing ends, to one of the hubs. Each hub is coupled to six spokes. The spokes are connected to the hubs to form isosceles triangles between adjacent spokes. A skin is coupled to the exoskeleton and defines an exterior of the airship.

In some embodiments, the airship can have an elliptical shape. The exoskeleton can have a plurality of regions including a front region, a rear region, and one or more central regions between the front region and the rear region. A diameter of the front and rear regions can be, in each case, less than a diameter of the one or more central regions. In some embodiments, each isosceles triangle includes two spokes of the same length extending lengthwise substantially along a length of the airship and one spoke of a different length running lengthwise along a circumference of the airship. In some cases, the isosceles triangles form rings along the circumference of the airship, the length of the spokes in each ring decreasing in successive rings as the rings become further from a center of the airship and closer to ends of the airship. The length of the spokes in each ring can decrease in successive rings by approximately 2 inches as the rings become further from the center and closer to ends of the airship. In some cases, the rings in the one or more central regions comprise a greater number of isosceles triangles formed by spokes than rings in either the front or rear regions. In some embodiments, the rings in the one or more central regions include 48 isosceles triangles, the rings in the front region include 12 isosceles triangles, the rings in the rear region include 12 isosceles triangles, and the exoskeleton has a first intermediate region between the front region and the one or more central regions and a second intermediate region between the rear region and the central region, each such intermediate region including 24 isosceles triangles. In some cases, each spoke that is running lengthwise along a circumference of the airship is connected, via a connection to a hub on opposing ends, to a spoke of the same length running along the circumference of the airship.

In some embodiments, the spokes are defined by tubular walls, each spoke having an identical diameter and wall thickness. The hubs can each include six cylindrically shaped inserts extending outwardly from a center portion, each insert seated within the tubular wall of a corresponding spoke to couple said hub to said spoke. In some cases, each hub has six separate multi-pronged sockets extending from the center portion of the hub. Each insert can have a protrusion at a first end adjacent to the center portion of the hub. Each protrusion can be seated within, and hingedly connected to, one of the multi-pronged sockets to hingedly connect the insert to the hub. In some embodiments, each multi-pronged socket includes three prongs and each protrusion includes two prongs.

In some embodiments, the spokes are carbon fiber and defined by tubular walls having a wall thickness of substantially 0.125 inches. In some cases, the skin is defined by curvilinear panels coupled to the hubs using a plurality of connector protrusions. Each curvilinear panel can include a plurality of connector protrusions and each hub can include a center opening. One or more connector protrusion can be seated within one or more of the center openings to couple one of the curvilinear panels to the exoskeleton. In some cases, each curvilinear panel includes a plurality of molded protrusions having a semi-cylindrical shape. The one or more molded protrusions can engage one or more of the spokes to couple one of the curvilinear panels to the exoskeleton. In some cases, at least one of the curvilinear panels can include a thin film solar collection cell embedded therein.

In some embodiments, the skin is bonded aramid fiber coated with polytetrafluoroethylene (PTFE). In some embodiments, the airship includes a nose cone coupled to the exoskeleton to define a front end of the airship. The nose cone can contain a pilot cabin from which the airship can be controlled. In some cases, the nose cone can be selectively decoupled from the airship. In some embodiments, the nose cone is configured to be selectively decoupled from the airship via explosive bolts that decouple said nose cone from the exoskeleton.

In some embodiments, the exoskeleton of the airship forms an elliptical shape. The airship can include a pointed front end coupled to the exoskeleton and a pointed rear end coupled to the exoskeleton. In some cases, the airship can include a plurality of cameras positioned to view an exterior environment of the airship from different positions, the cameras configured to generate image data. A display screen can be configured to generate a virtual model of the surrounding environment based on the image data.

In some embodiments, the airship includes a cargo storage area located within the exoskeleton. In some cases, at least one curvilinear panel is configured to act as a door, selectively opening to provide a pathway between the cargo storage area and an exterior environment and closing to seal the pathway. In some embodiments, a plurality of unmanned aerial vehicles (UAVs) are configured to transport a payload, said payload being at least one of the following: a package or parcel, a person, telecommunications equipment, or remote monitoring equipment. In some cases, the UAVs can be powered by compressed or liquid hydrogen. In some embodiments, the UAVs are configured to communicate with a beacon, the beacon designating a destination, to deliver or from which to retrieve cargo at the destination. In some cases, one or more of the UAVs include a camera, said one or more UAVs configured to capture a photographic image of a package delivery. In some cases, one or more of the UAVs include a barcode scanner, said one or more UAVs configured to scan a barcode on the payload with said barcode scanner.

In some embodiments, the airship includes communications equipment configured to retransmit a plurality of signals, said signals being at least one of the following: a cellular signal; or a satellite signal. In some cases, the airship is further configured to remain in a relatively stationary position within transmission range of an area and the communications equipment is configured to retransmit the signals to communications devices in the area. The communications equipment can include an operational platform configured to perform intelligence, surveillance, and reconnaissance (ISR) duties.

In at least one aspect, the subject technology relates to an airship and system for landing the airship. The airship contains lighter-than-air gas and has an exoskeleton defined by a plurality of spokes of varying length and a plurality of hubs, each spoke coupled, at opposing ends, to one of the hubs. Each hub is coupled to six spokes. The spokes are connected to the hubs to form isosceles triangles between adjacent spokes. The airship includes a skin coupled to the exoskeleton and defining an exterior of the airship. The airship also includes at least two tie-down cables, each tie-down cable having a first end physically connected to said exoskeleton. A cradle is configured to hold the airship, the cradle having at least two anchor points. Each tie-down cable includes a second end, opposite the first end, the second ends configured to attach the tie-down cables to the anchor points to secure the airship to said cradle. In some cases, the airship is further configured with at least two guide-wire cables, each guide-wire cable being connected at one end to a tie-down cable and at the other end to a pilot locator. The pilot locator can be one of the following: a projectile that is attracted electromagnetically to an anchor point, an autonomous drone that is drawn to a homing beacon at an anchor point, or a remotely controlled drone. Once each pilot locator has located the appropriate anchor point, the guide-wire directs the second end of each tie-down cable to said anchor point. In some cases, the cradle has wheels and is situated on a track that permits the airship, once secured to said cradle, to be moved. In some embodiments, the cradle is positioned on a turntable structure, the turntable structure configured to rotate to point the airship in a direction of on-coming wind during landing or takeoff of the airship. In some cases, rotation of the turntable structure is automated to account for the direction of on-coming wind and each tie-down cable is configured to be pulled through its respective anchor point by a winch. In some cases, a gangway can be included, the gangway configured to extend from or to the airship to load or unload cargo when the airship is secured to the cradle. In some cases, when the airship is secured to the cradle, the gangway and cradle can preclude the airship from ascending.

In at least one aspect, the subject technology relates to a method of delivering cargo using an airship. The airship is provided, the airship containing a lighter-than air gas. The airship includes an exoskeleton defined by a plurality of spokes of varying length and a plurality of hubs, each spoke coupled, at opposing ends, to one of the plurality of hubs. Each hub is coupled to six spokes and the spokes are connected to the hubs to form isosceles triangles between adjacent spokes. The airship also includes a skin coupled to the exoskeleton and defining an exterior of the airship, the skin being defined by a plurality of curvilinear panels. A cargo storage area is located within the exoskeleton. The method includes identifying at least one delivery destination and delivering cargo to the at least one destination. In some cases, the airship includes at least two tie-down cables, each tie-down cable having a first end physically connected to the exoskeleton. The method can include providing a cradle, the cradle comprising at least two anchor points configured to connect to the tie-down cables to secure the airship. The method can include causing the airship to descend into the cradle by releasing or re-compressing lifting gas. A second end of the at least two tie-down cables is then secured to anchor points, the second ends being opposite respective first ends. Cargo is removed from the storage area and also loaded into the storage area.

In some embodiments, a turntable platform is provided, the turntable platform configured to hold both the cradle and the airship. Prior to causing the airship to descend into the cradle, the turntable platform is rotated so that the cradle is oriented to point in a direction of on-coming wind. In some embodiments, the airship includes a display screen and a control unit configured to control the airship. The control unit controls the airship based, at least in part, on algorithms, the algorithms accounting for operating conditions, including one or more of the following: a compression, release, or recompression of lifting gas; an amount of thrust and orientation of engines of the airship; and a relative position of the airship to a destination. The method further includes using the display screen, by the pilot, to deliver commands to the control system to land the airship at the destination. The control system can employ the algorithms to: effect release valves and compression systems to release or recompress lift gas at a rate calculated for safe descent of the airship; effect engine positioning systems to adjust a direction of each engine to an orientation calculated for safe descent of the airship; effect the engines to adjust the thrust of each engine to a speed calculated for safe descent of the airship; and communicate with the turntable platform to rotate the turntable platform so the cradle points in a direction of on-coming wind.

In at least one aspect, the subject technology relates to a method of delivering goods using an airship. The airship is provided, the airship containing a lighter-than-air gas. The airship has an exoskeleton defined by a plurality of spokes of varying length and a plurality of hubs, each spoke coupled, at opposing ends, to one of the plurality of hubs. Each hub is coupled to six spokes and the spokes are connected to the hubs to form isosceles triangles between adjacent spokes. The airship includes a skin coupled to the exoskeleton and defining an exterior of the airship, the skin being defined by a plurality of curvilinear panels. The airship includes a cargo storage area located within the exoskeleton and a plurality of unmanned aerial vehicles (UAVs) configured to transport cargo. The method includes identifying at least one delivery destination and delivering, by the UAVs, cargo to the at least one destination. In some embodiments, the UAVs deliver cargo to the at least one destination using a global positioning system and destination coordinates.

In some embodiments, the airship includes a display screen and a control unit for controlling the UAVs. In some cases, delivering cargo by the UAVs can include controlling the UAVs using the display screen and control unit. In some cases, after delivering cargo at the at least one destination with the UAVs, the method includes flying back to the airship, by the UAVs, and docking within the cargo storage area. In some embodiments, after delivering cargo at the at least one destination with the UAVs, the method includes flying the UAVs to a first additional location, retrieving a package from the first additional location, and delivering the package to a second additional location. In some cases, the method includes opening at least one of the curvilinear panels and directing one of the UAVs through an open curvilinear panel to enter or exit the airship.

In at least one aspect, the subject technology includes a method of delivering goods using an airship. The airship is provided, the airship containing a lighter-than-air gas. The airship includes an exoskeleton defined by a plurality of spokes of varying length and a plurality of hubs, each spoke coupled, at opposing ends, to one of the plurality of hubs. Each hub is coupled to six spokes of the plurality of spokes and the spokes are connected to the hubs to form isosceles triangles between adjacent spokes. The airship includes a skin coupled to the exoskeleton and defining an exterior of the airship, the skin being defined by a plurality of curvilinear panels. The airship includes a cargo storage area located within the exoskeleton and a plurality of unmanned aerial vehicles (UAVs) configured to transport cargo. The method includes identifying at least one retrieval destination and retrieving, by the UAVs, cargo at the at least one retrieval destination. In some cases the method includes directing the at least one UAV, by a beacon, to the at least one retrieval destination. The beacon can be configured to pulse a signal identifiable by the UAV for directing the UAV.

In at least one aspect, the subject technology relates to a method of retransmitting wireless signals using an airship. The method includes providing the airship, the airship containing a lighter-than-air gas. The airship includes an exoskeleton defined by a plurality of spokes of varying length and a plurality of hubs, each spoke coupled, at opposing ends, to one of the plurality of hubs. Each hub is coupled to six spokes and the spokes are connected to the hubs to form isosceles triangles between adjacent spokes. The airship includes a skin coupled to the exoskeleton and defining an exterior of the airship, the skin being defined by a plurality of curvilinear panels. The airship also includes communications equipment configured to retransmit the wireless signals. The method includes positioning the airship within wireless transmission range of an area with poor wireless signal coverage and retransmitting the wireless signals, with the communications equipment, to the area.

In some embodiments, the method includes providing one or more of the following within the area by retransmitting the wireless signals: high-speed Internet; telephone services; televisual services; and global positioning systems services. In some embodiments, the method includes setting a travel route for the airship and identifying at least one area with poor wireless signal coverage within the travel route. The wireless signals can be retransmitted when the airship is within wireless transmission range of the at least one area with poor wireless signal coverage within the travel route.

In some embodiments, the method includes, as the airship leaves wireless transmission range of one of the areas with poor wireless signal coverage, identifying a second airship approaching wireless transmission range of said area with poor wireless signal coverage. Then, after the second airship is within wireless transmission range of said area with poor wireless signal coverage, the wireless signal is retransmitted with the second airship. The method can include providing a plurality of unmanned aerial vehicles (UAVs) configured to transport cargo and to retransmit the wireless signals. The method can then further include retransmitting, by the UAVs, the wireless signals within the area with poor wireless signal coverage.

BRIEF DESCRIPTION OF THE DRAWINGS

FIG. 4(a) depicts the improved identical hubs and variable length spokes design used to construct the exoskeleton of the airship. FIG. 4(b) and FIG. 4(c) depict optional means for attaching the airship skin to said hubs and spokes, respectively.

FIG. 8(a) depicts an optional preferred method for mooring an airship using a cradle; and FIG. 8(b) illustrates use of an optional turntable to point the cradle into the wind, enabling the airship to land and take-off in varying wind conditions and yet be moved into a fixed hanger using tracks and a tug.

FIG. 9(a) through FIG. 9(c) summarize the prior art in utilizing the gondola of a lighter-than-air airship as an aerial warehouse for storage and as a launchpad for package delivery by UAVs, UASs, or the like.

FIG. 10(a) and FIG. 10(b) depict an improved design for incorporating unmanned aerial vehicles for picking up, delivering and effecting the return of payload from a remote point of origin to where such payload is needed, and as a communications platform for beam form transmission and satellite signal relay.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. As used throughout this application, the word "may" is used in a permissive sense (i.e., meaning having the potential to) rather than the mandatory sense (i.e., meaning must). Similarly, the words "include," "including," and "includes" mean including, but not limited to. Additionally, as used herein, the terms "coupled" or "attached" may refer to two or more components connected together, whether that connection is permanent (e.g., welded or glued) or temporary (e.g., bolted, held by a pin, held in place by friction or tension, or through pairing), direct or indirect (i.e., through an intermediary), mechanical, chemical, optical or electrical.

DETAILED DESCRIPTION OF THE DRAWINGS

The subject disclosure describes improvements over the prior art, including the exoskeleton structure of an airship; the method for transporting, loading and unloading freight from the hull of an airship; the means of locating and tethering the airship to ground-based operations and to provide added safety and enable superior operability. In this regard, the instant disclosure provides an airship with an improved hub and spoke structure to enable variable length spokes to flex to different radii in addition to different slopes and material changes in the airship's circumference along its surface to enable use of tubes that preferably have the same diameter and hub structures that in a preferred embodiment are identical, and thereby to provide substantial production and cost efficiencies and simultaneously produce superior strength over the prior art for dirigible design.

The present disclosure also includes, in one preferred embodiment, a prefabricated nose cone, optionally including a pilot's cabin that may be closed and pressurized and/or that may be physically separated from the rest of the exoskeleton in response to a catastrophic event or for autonomous and/or remotely piloted operation. The present disclosure also integrates in one alternative preferred embodiment the use of unmanned aerial vehicles to assist in the pick-up, transport and delivery of goods and other payload; and in yet a further alternative embodiment integrates communications equipment into a system that is used both to assist in accurate and timely pick-up and delivery of such payload as well as, in an optional embodiment, for beam forming and satellite retransmission service.

Figure 1:
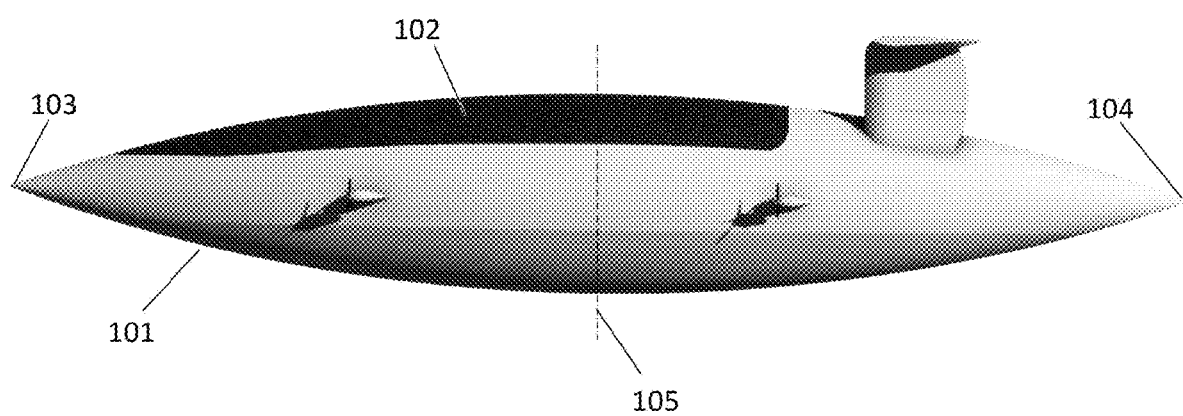
FIG. 1 depicts a lighter-than-air airship in accordance with the principles of this disclosure.

These and other aspects of the subject technology are disclosed through use of the following illustrative figures:

FIG. 1 depicts a lighter-than-air airship 101 in accordance with the principles of the subject technology. In one preferred embodiment, such airship 101 includes optional solar panels 102 and is 1000' in length between nose 103 and tail 104; and has a 150' diameter at midpoint 105. In alternative embodiments, longer or shorter length airships 101 may be used while adhering to the principles of this disclosure, as may different relative proportions of the length to diameter at the midline, provided that it is deemed preferable that the shape will result in laminar flow of air over the outer surface of said airship 101 and thereby minimize its coefficient of drag. Such attributes enable airship 101 to travel at a higher speed while minimizing the amount of energy required for forward thrust; and along with the greater interior volume achieved through use of an exoskeleton to maximize the available area for holding a lighter-than-air gas such as hydrogen or helium to provide lift, the combination of these attributes represent highly desirable criteria in producing an improved airship structure. In addition, use of an interior cargo area rather than an appended gondola structure enables airship 101 to transport oversized cargo including parts for windmills, airline and spacecraft assemblies, bulk automobile deliveries, and electrolyzer and fuel cell units.

Figure 2:
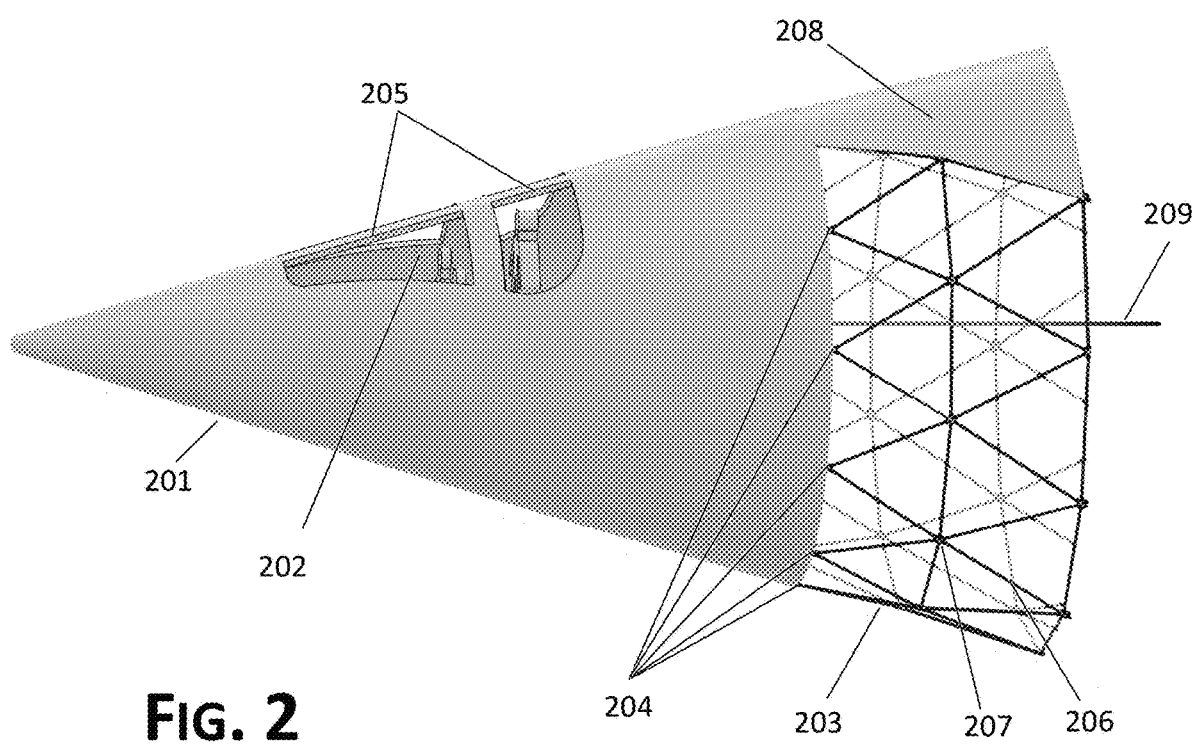
FIG. 2 is a perspective view of the nose cone of the lighter-than-air airship structure for use in one preferred embodiment of the subject technology.
Figure 4:
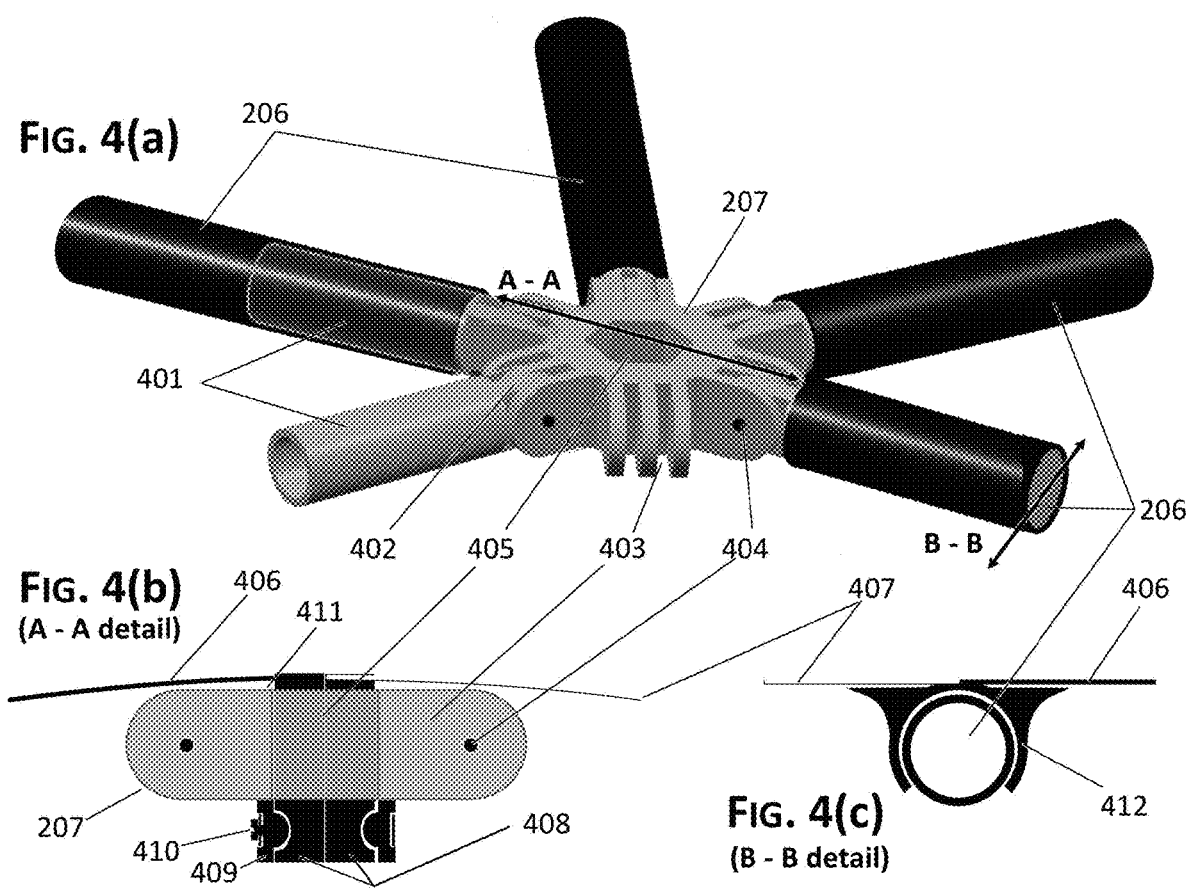
FIG. 4(a) through FIG. 4(c) depict the exoskeleton of the airship and means for attaching its skin and solar panels.

FIG. 2 includes an illustration of nose cone 201 containing in one preferred embodiment cockpit cabin 202 located therein and showing, for illustrative purposes only, an average height person standing several feet behind two seated pilots in said cockpit cabin 202. In such one preferred embodiment of airship 101, nose cone 201 is approximately 40 feet long, and at its widest end is approximately 25 feet in diameter, although different dimensions may be used without departing from the principles of the subject disclosure. In a preferred embodiment of airship 101, the diameter of nose cone 201 at its largest end corresponds to the diameter at the narrowest point of exoskeleton 203, which is constructed of the improved hub and spoke structure employing variable length tubular spokes that, in a preferred embodiment, have the same inside and outside diameter, and hub structures that are preferably identical, each as more particularly described with respect to FIG. 4A, below.

In one preferred embodiment, the crash safety of such prefabricated nose cone 201 will be provided by the geometry of said component and incorporation of joints and structures known to result in lateral and torsional rigidity based on their ability to absorb impact energy as used when constructing the driver compartment in high performance race cars. In another preferred embodiment of the subject technology, at the connection points such as junction points 204, where exoskeleton 203 attaches to said nose cone 201, said junction points 204 may utilize explosive bolts to enable nose cone 201 to break away from the rest of airship 101, which may be useful to protect the lives of the crew members in the instance of a catastrophic failure of the airship, as more fully described with respect to FIG. 6, below.

Nose cone 201 is in one preferred embodiment fabricated from a lightweight composite material or metal such as aluminum or titanium whose mechanical properties contribute to the safety of its occupants while simultaneously minimizing the overall weight of airship 101. In yet another preferred embodiment, nose cone 201 includes one or multiple reinforced glass or acrylic windows 205, providing visibility for the pilot and members of the airship crew to use in navigating airship 101, preferably in combination with various real-time images from remote cameras and other controls as more particularly described with respect to FIG. 3, below.

Said exoskeleton 203 is constructed using variable length tubular ribs or spokes 206, that preferably are fabricated or extruded with an identical wall thickness and outside diameter; and terminate in numerous preferably identical hubs 207, except in those instances when the number of such triangles comprising the circumference of airship 101 changes (as more particularly described with respect to FIGS. 5(a)-(b) below) and at junction points 204 where exoskeleton 203 attaches to nose cone 201 (and an optional tail cone). Each such preferably identical hub 207 is used to join six spokes 206 in a hexagon structure, whose basic structural unit is a triangle that, as more particularly described with respect to FIG. 4(a) through FIG. 4(c), is as close as possible to being an equilateral triangle (meaning that all three spokes 206 are exactly equal in length and all three angles are each 60°). The hexagons made from such triangles are joined together to form the structural shape of airship 101, to which outer skin 208 is attached, resulting in airship 101 having greater structural integrity than airships of the prior art.

In another one preferred embodiment, junction points 204 where exoskeleton structure 203 is attached to nose cone 201 may employ exploding bolts that are triggered in the event of a catastrophic event to physically separate said nose cone 201 from the balance of airship 101. In another optional embodiment, cable 209 provides additional lateral rigidity of airship 101, connecting nose cone 201 to the optional tail cone (not illustrated). In this optional embodiment, such preferably multistrand cable 209 runs the full length of airship 101 and may be adjusted (e.g., tightened or loosened) to affect its lateral rigidity, and may be rapidly decoupled along with exploding bolts are points 204 to allow for separation of nose cone 201 in response to a catastrophic event.

Figure 3:
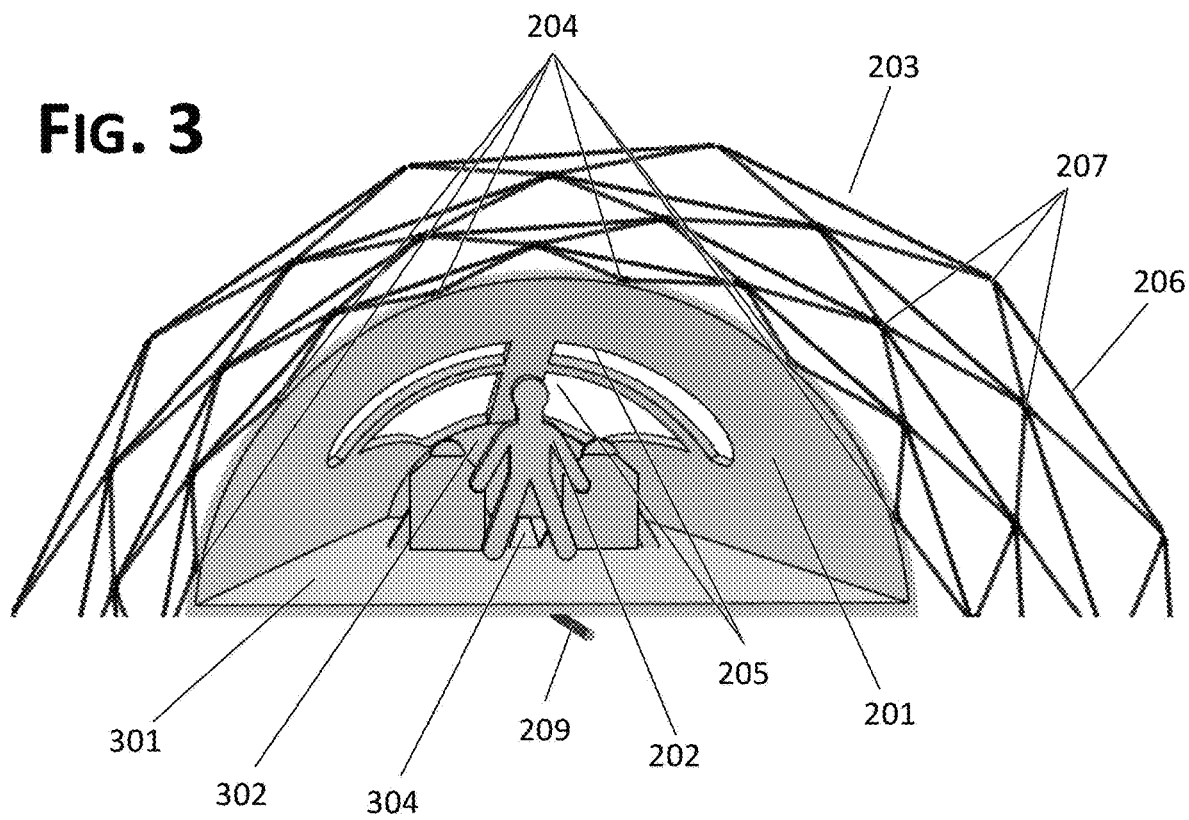
FIG. 3 depicts an interior view of the upper portion of said nose cone, showing the optional location for the pilots to operate the airship and the location of a display screen that enables the pilots to view from one location all key elements of said airship.

Turning next to FIG. 3, an illustration is provided of the interior of cockpit cabin 202 comprising in one preferred embodiment the upper approximately half of said nose cone 201 that in one optional embodiment may be closed and pressurized. Floor 301 is provided to enable one or more average height adults to comfortably stand at the rear of such cabin 202, and to have visibility through rear windows 205. Optionally, this space, as well as the lower approximately half of nose cone 201 (not illustrated) may be used for restrooms, sleeping accommodations, electronics equipment and supplies. Sufficient room is preferably provided for two pilots to sit, each having at least partial visibility forward and to each side through front windows 205.

Persons of ordinary skill in the art of airships will readily understand that it is impossible from any vantage point for a pilot to have direct line-of-sight visibility in all six directions given the sheer size of the airship. For this reason, and to provide visibility to all critical operating components and relevant instrument readings, a display screen 302 (which can be a large electronic display screen or panel, or multiple smaller screens, panels or screen-within-a-screen displays) is, in one preferred embodiment of airship 101, located directly in front of the pilots. The surface of such display screen 302 may be flat or curvilinear in shape, and the images may in such preferred embodiment incorporate 3D visualizations, augmented reality enhancements, heads-up displayed data and pre-programmed reference information and images, to increase the utility of real-time images displayed thereon.

Through the use of remote cameras, such display screen 302 will afford airship 101 pilots with unrestricted visibility forward and backward. In addition, from various vantage points along the length of the airship, visibility will be provided above and below airship 101, as well as to both its left and right side. By way of non-limiting example, such real-time images may be enhanced with direction of travel, airship 101 orientation, ground speed, and information identifying and designating the distance from physical objects shown in the line of sight, as well as a computer-generated plot of the path airship 101 should take to avoid approaching obstacles, or to circumnavigate weather conditions with certainty that might threaten its operation. 3D images and composite visualizations comprised of real-time and stored images also may be used to help facilitate maneuvering airship 101, and as references for real-time observed conditions.

In another preferred embodiment, display screen 302 will also enable airship 101 pilots to see real-time remote camera views of all its critical operating components, including by way of non-limiting example, the individual ballonets, compressors, engines, fuel storage tanks, and fuel cells (if any). Such images may be augmented with operating data such as temperature, pressure, gas velocity, compression rate, power level, percentage of expected performance, acceptable ranges, out-of-bounds warnings and safety alerts. Display screen 302 may also show graphical representations of one or more flight instruments such as an artificial horizon, altimeter, directional gyroscope, horizontal situation indicator, wind direction, or the like.

These images and information can be used by said pilots in controlling airship 101 through the use of touchscreen controls on such display screen 302; a wheel, mouse, mouse pad, control stick or the like 303 (not shown); and/or various controllers located on control panel console 304, which will in turn enable turning, actuating control surfaces in the tail, tilting and/or adjusting the thrust of the engines, inflating or deflating the ballonets to respectively effect an increase or decrease in lift, and the like. Moreover, in yet another one preferred embodiment, through the use of artificial intelligence (AI), some of such maneuvers including landing logistics as more particularly described with reference to FIGS. 7 and 8, below, may be pre-programmed. By way of a non-limiting example, the pilot's indicated desire to turn airship 101 left by 20° and to descend slowly towards a selected destination point may be translated through AI into the appropriate adjustments in the level of power and rotation of its engines, gradually deflating the front left ballonet at a faster rate than the others, and correspondingly actuating the appropriate aileron position; and in the foregoing illustrative example, display screen 302 may reflect the estimated altitude, ground speed and time that airship 101 will reach the indicated destination.

The use of airship 101 for carrying a payload such as freight provides a useful additional non-limiting illustration of the relevance of such control systems incorporating AI and augmented reality, as well as the utility of real-time video display screen 302 in one preferred embodiment of the subject technology. In a preferred embodiment, airship 101 is maintained neutrally buoyant at all times, both while it is "on the ground" (generally meaning that it is within a few feet of touching the ground) as well as when it is in flight. Even to the extent that airship 101 is purposely made heavier than air, for example so that it will securely rest on a ground-based cradle or gantry as described with respect to FIGS. 8(*a*)-(*b*), it may be desirable that a portion of its overall weight be lifted by an appropriate amount of lighter-than air gas.

As persons of ordinary skill in the art will readily understand, as payload is loaded onto airship 101 and later when it is removed in bulk containers or in direct deliveries to end-users as described with regard to FIGS. 10(*a*)-(*b*), different amounts of lift gas are required to maintain such neutral buoyancy (or maximum controlled weight) condition. Accordingly, such payload must be accurately weighed; and to maintain neutral buoyancy the net increase or decrease in cargo weight must be taken into account when adjusting the correct amount of lift gas. Similar incremental adjustments in the quantity of lift gas required for airship 101 to maintain neutral buoyancy must be made as a transportation fuel such as bio-diesel or aviation gas is consumed during transit; or in the case of fuel cells, as water is produced as a by-product from gaseous or liquid hydrogen being consumed. In a preferred embodiment of airship 101, such calculations are made using such AI system to adjust operating components such as compressors, ballonets, venting lines, and the like in response to a crew member's decision to load or unload freight, as part of a pre-programmed landing routine, or to change altitude or ground speed thereby changing the speed that fuel is consumed.

In an optional embodiment, cockpit cabin 202 may be windowless and be configured in such a manner to immerse the pilots in a three-dimensional universe, at the center of the action to create the sensation of total immersion by the pilot and thereby increase efficacy and safety.

In addition to being used for controlling airship 101, in one preferred embodiment such control systems and display screen 302 may be selectively used to control one or multiple unmanned aerial vehicles used to locate and tether the airship as described with respect to FIGS. 7(*a*)-(*b*), and/or to effect payload delivery or pickup as more particularly described with respect to FIGS. 10(*a*)-(*b*), below.

Moreover, utilizing principles that are well known with respect to the control of drone aircraft, in one optional embodiment, these controls systems and displays may be used to remotely control airship 101 from a site that is physically located in a ground station which transmits digitally telemetered command signals to airship 101 (or one or more selected UAVs). And in yet another optional embodiment, these control systems enable airship 101 and/or UAVs to operate autonomously based on their respective pre-programmed instructions, or to be changed from autonomous to a remotely piloted vehicle (RPV) mode, or vice-versa, in response to certain conditions or selection commands.

The foregoing described controls and displays will materially improve the pilots' perception of outside conditions and provide ready access to see key operating components of airship 101, thereby resulting in greater safety, less vulnerability to problematic weather conditions, and reductions in the number of crew members who, in the case of airships of the prior art, were required to directly observe such conditions and make adjustments that can be addressed in an improved airship design from a single location that can be physically separated from airship 101, if and as desired.

In one preferred embodiment, behind display screen 302 (and thereby concealed from view in FIG. 3) the remaining forward portion of nose cone 201 is the location of the antenna and avionics package for airship 101, as well as the forward-facing camera used to provide selected ones of the aforementioned real-time video images. As noted above, electronic equipment, including computers, data storage devices, instruments, telemetry, additional display panels and communications equipment, may be located below floor 301 and/or in the rear portion of cockpit cabin 202, where this equipment can be readily accessible in the event it requires attention by a member of the flight crew of airship 101.

Turning now to FIGS. 4(a)-4(c), therein FIG. 4(a) provides a detailed view of the hub and spoke system used in the improved design of exoskeleton 203 of airship 101 in one preferred embodiment of the subject technology. In order to distribute the skeletal stresses when airship 101 hovers, ascends to altitude, descends, on- and off-loads payload, and makes turns, such exoskeleton 203 is constructed of spokes 206 that are preferably equal in diameter and wall thickness, and hubs 207, that are all preferably identical. As shown therein, variable length spokes 206 terminate at each hub 207 to form a set of hexagrams comprised, as nearly as possible, of six equilateral triangles. This set of connected hexagrams forms the three-dimensional shape of airship 101 by allowing spokes 206 to flex to different radii and adjust to different lengths to produce the slope and desired circumference at each point along the surface of airship 101. Based on the principles of the subject technology, this novel combination will maximize the strength of airship 101 using a minimum amount of structure, and thereby minimize the weight of airship 101 and maximize its available payload capacity. In addition, use in a preferred embodiment of identical hubs 207 and equal diameter and thickness spokes 206 will result in the ability to achieve mass production economies in the fabrication of such components, thereby minimizing the cost of constructing airship 101.

Based on applying the foregoing principles, in one preferred embodiment of airship 101, spokes 206 are made using 2" outside diameter spun or extruded carbon fiber material with a wall thickness of 0.125"; and said hubs 207 are made using titanium, carbon fiber or another lightweight material. However, in other optional embodiments, spokes 206 may have a larger or smaller outside diameter and/or wall thickness. In addition, different materials may be used in fabricating spokes 206 and hubs 207 without departing from the principles of the subject technology.

As shown in FIGS. 4(a)-4(c), six of said spokes 206 attach to a hub 207 to construct the six triangles that are as nearly equilateral as possible, and together comprise a hexagon shape. For such triangle to be equilateral, the length of each of spokes 206 would be the same and all three angles would be 60°. However, a slight change may occur in the length of one leg of each successive triangle and at least one angle may be less than 60° in order to produce the smoothly sloping elliptical shape of airship 101 and exoskeleton 203, as shown in FIGS. 5(a)-(b). In the foregoing illustrative case, a total of 48 isosceles triangles that are as nearly equilateral as possible are used to construct the approximately 471-foot circumference of the ring of triangles at the midpoint of exoskeleton 203 of the 150-foot diameter airship 101, with each leg of such triangles being approximately 9.8 feet (118 inches) in length including its proportionate share of hubs 207.

Because the circumference of the next ring of triangles moving away from the midline and towards either end of airship 101 is in a preferred embodiment somewhat shorter, with each successive ring of triangles the length of spokes 206 becomes increasingly shorter. For example, assuming that at the next ring of triangles, the diameter is 148 feet, the circumference of the ring is approximately 465 feet in length, resulting in the length of each leg of these 48 triangles decreasing by approximately 2 inches (to 116 inches) in length including its proportional share of hubs 207. Because one leg of every other triangle in this ring is shared with the triangles in the previous ring, the difference of approximately 2 inches in length is addressed in one preferred embodiment through the introduction of an approximately 7-inch insert 401 into the end of each spoke 206. Insert 401 permits the difference in length between the triangles in the adjoining two rows to be addressed, while simultaneously maintaining as nearly as possible an equilateral triangle pattern and thereby attaining the strength/weight advantages of the geodesic structure of exoskeleton 203.

As diagrammatically illustrated in FIG. 4(a), each hub 207 and one end of each insert 401 are formed in a way that enables the angle to change as exoskeleton 203 in one preferred embodiment proceeds from 150 foot in diameter at the midpoint of airship 101 to a diameter of approximately 24.3 feet where exoskeleton 203 couples with nose cone 201. In one preferred embodiment, this variable slope is accommodated with a coupling in which two-pronged protrusion 402 of each insert 401 is inserted into each of six, three-pronged sockets 403 to create a hinge on all six sides of hubs 207, each preferably held in place by insertion pin 404. In one alternative embodiment, insert 401 has a single-pronged protrusion that is inserted into each of six two-pronged sockets similar to a clevis fastener or fork joint to create such hinge on all sides of hubs 207, and held in place by insertion pin 404. Alternative hinge means may also be used to achieve the principles of the subject technology.

FIG. 4(a) also illustrates opening 405, which serves both to reduce the weight of said hub 207 and simultaneously to assist in attaching skin 208 to exoskeleton 203. FIG. 4(b) provides a cross-sectional view of Section A-A shown in FIG. 4(a) to illustrate one optional means of coupling skin 208 to exoskeleton 203 using hubs 207.

In one preferred embodiment, skin 208 of airship 101 is fabricated in flat or curvilinear panels 406 that are made with a lightweight composite material such as bonded aramid fiber coated with PTFE (Polytetrafluoroethylene) to produce a low density and high tensile strength covering with a slick, non-wetting surface that is highly resistant to extreme temperatures (−50° C. to +200° C.), fire resistant and flame retardant. In surface areas where airship 101 is likely to have the longest amount of exposure to the sun, in another one preferred embodiment, thin film solar collection cells 407 may be embedded into such flat or curvilinear fabricated panels 406 to produce solar array 102. Such solar cells 407 are preferably very thin, light weight, and may use materials such as Gallium Arsenide (GaAs) and other substrates to enable collection efficiencies in excess of 15% to 20%. Persons of ordinary skill will appreciate that all of the foregoing materials are described for illustrative purposes and that other materials may be used without departing from the principles of the subject technology.

As shown in FIG. 4(b), in one preferred embodiment, molded protrusion 408 made from a lightweight extruded or bonded material may be coupled to the back of panels 406 (optionally including embedded solar collecting material 407) comprising skin 208. In one preferred embodiment, protrusion 408 may be inserted into hub opening 405 and held firmly in place using a variety of means including, in one optional embodiment, clamp 409 and tightening bolt 410. To the extent an individual panel 406 covers one triangular space and directly abuts another panel 406 on each adjacent triangle, such protrusions 408 may comprise one sixth of such opening area 405. Alternatively, depending on the number and shape of such panels 406 covering said hub 207, in alternative embodiments such protrusions 408 may fill some portion greater that one-sixth, and up to all of said opening area 405.

As also shown in FIG. 4(b), to the extent skin 208 is smoothly curved and hubs 207 are identical, a void space of varying dimension may be created between curvilinear panels 406 and portions of at least some hubs 207. Where necessary to preserve the integrity of the curved shape of skin 208, this void space may be avoided in an optional embodiment by fabricating hubs 207 with a top surface shape customized to reflect the curvilinear shape of panels 406 (optionally including embedded solar collecting material 407), or through use of a shim 411 contoured to fill such void space.

FIG. 4(c) provides a cross-sectional view of Section B-B shown in FIG. 4(a) to illustrate another optional means of coupling skin 208 to said exoskeleton 203 using spokes 206. As shown in FIG. 4(c), a molded protrusion 412 may be made from a lightweight extruded or bonded material coupled to the back of panels 406 (optionally including embedded solar collecting material 407) comprising skin 208. Protrusion 412 may then be pressed over spokes 206 and held firmly in place using a variety of known means including the clamp shape of molded protrusion 412 in one optional embodiment. Other means of coupling skin 208 of airship 101 to hubs 207 and spokes 206 may be employed that are consistent with the principles of the subject technology.

Figure 5:
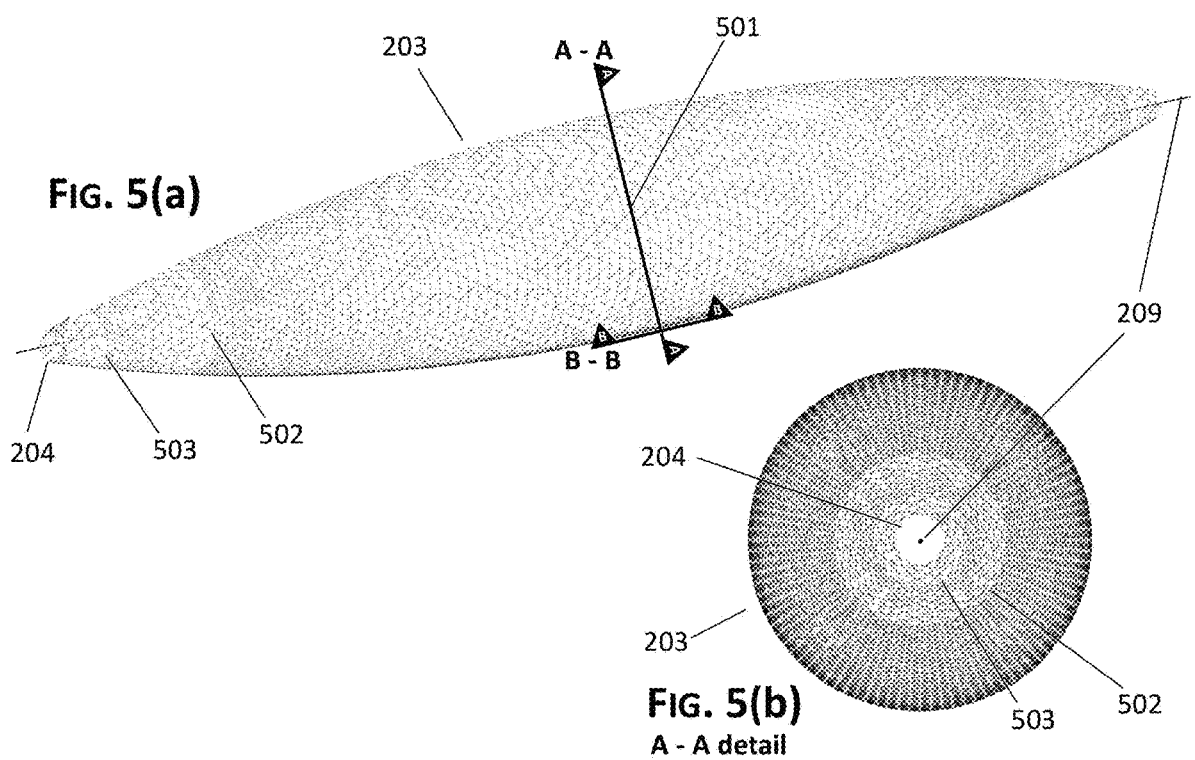
FIG. 5(a) and FIG. 5(b) depict the exoskeleton constructed using the principles of the subject technology.

Turning next to FIGS. 5(a)-(b), which illustrates exoskeleton 203 in one preferred embodiment of airship 101. As shown in FIG. 5(a), line 501 roughly corresponds to the midline of airship 101. As noted above, assuming a diameter at said midline 501 of 150 feet, the circumference of airship 101 is approximately 471 feet long at said midline 501. This circumference may be provided with a ring comprised of the base legs of 48 equal isosceles triangles forming spokes 206 that are each 118 inches long including a proportionate share of hubs 207 connecting such 48 triangles' base legs. The other two spokes 206 of these isosceles triangles are as nearly equal in length as possible to said base legs, though also taking into account the length of spokes 206 in the next successive ring of triangles. In optional embodiments, the number of triangles at the midline may be more or less than 48, provided that the selected number should, in a preferred embodiment, be a number such as a multiple of 12 (e.g., 24, 36, 48, 60, 72) that will enable that number to be successively divided in half each time the length of spoke 206 reaches the minimum acceptable length.

In one preferred embodiment, the length of the longest triangle spoke 206 is 120 inches (10 feet) in length, or the shortest triangle spoke is 60 inches (5 feet) in length (each such measurement including a proportionate share of associated hubs 207). In such one preferred embodiment, when the length of spoke 206 approaches 60 inches, the number of triangles may be reduced by half (i.e., in the case of the foregoing illustration, from 48 to 24 triangles) with the opposing spokes 206 of every other triangle comprising the next narrower circumference being twice as long as the base of spokes 206 in the previous ring made up of double the number of triangles.

The foregoing principle is illustrated in such one preferred embodiment at point 502, where the cumulative reduction by a few inches with each successive ring of isosceles triangles reaches a sufficient length that a change is dictated in the number of triangles comprising the next ring. Accordingly, in such one preferred embodiment, at point 502, the number of triangles in exoskeleton 203 is reduced from 48 to 24 in the next smaller ring and the length of spokes 206 of these triangles is twice as long as in the previous ring. This reduction by half happens again at point 503, when the number of isosceles triangles is reduced from 24 to 12 in such one preferred embodiment and the length of spoke 206 is again twice as long as spokes 206 in the previous ring. This number of triangles is used in such one preferred embodiment until the final ring has a diameter of approximately 24.3 feet at point 204, where exoskeleton 203 will attach to nose cone 202, as previously discussed with regard to FIG. 2, above.

These places 502 and 503 where the number of isosceles triangles is reduced by half and there is a corresponding doubling in the length of spokes 206, as described above, are also illustrated in FIG. 5(b), which provides a cross-sectional view of Section A-A from FIG. 5(a). Based on applying the foregoing principles, and in each case reducing the base leg of the isosceles triangle as little as necessary so that all of the angles as close as possible to being 60 degrees, in such one preferred embodiment, exoskeleton 203 for the 1000' long airship 101 requires approximately 5,600 hubs 207 and, in the aggregate, utilizes approximately 120,000 lineal feet of 2" diameter carbon fiber tubing 206, resulting in a savings in weight and enhanced structural integrity compared to earlier airships of the prior art. Moreover, based on utilizing the materials described in the foregoing illustrative disclosure, a finite element analysis of the foregoing structural system indicates that airship 101 is able to climb at a vertical acceleration rate of 0.2 g (roughly 6.43 ft/s$^2$, or approximately 1,000' every 2.6 minutes) and to turn at the rate of 2° per second (completing a 90° turn in 45 seconds) without any problematic stress on such structure.

Figure 6:
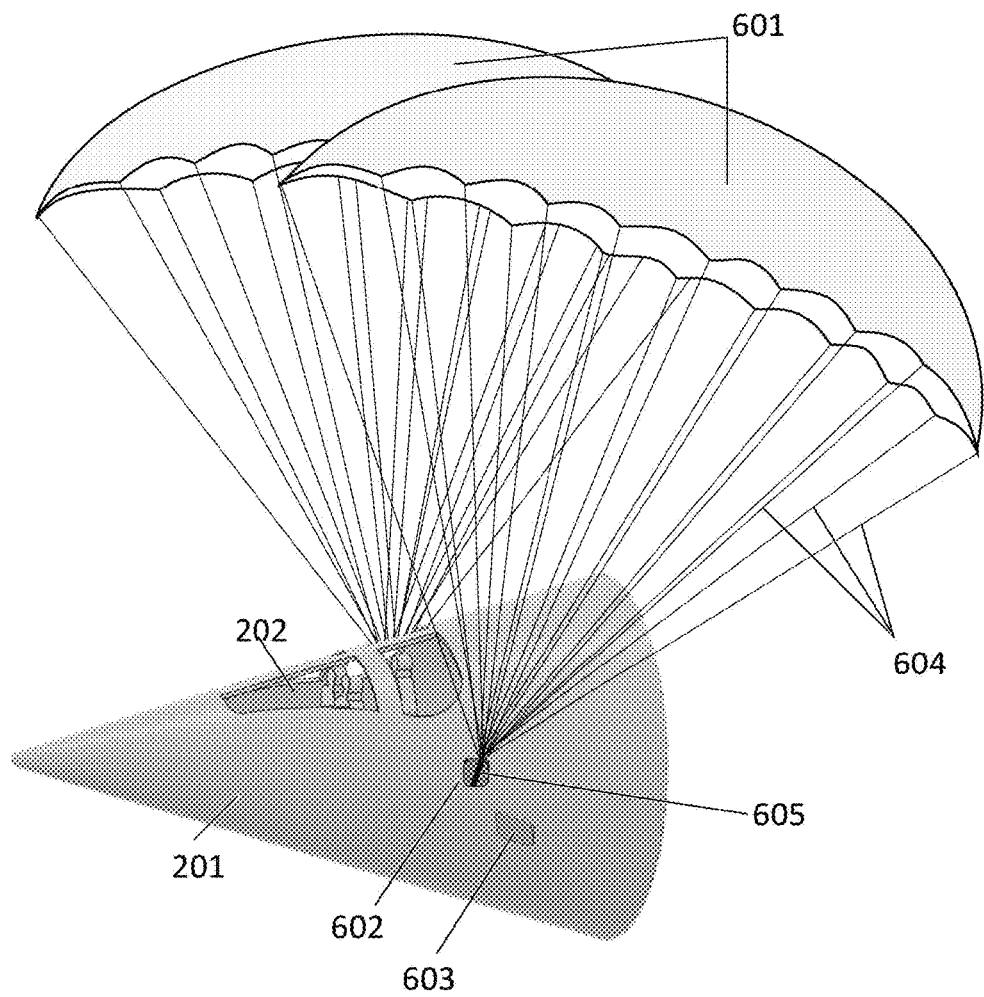
FIG. 6 is a view similar to FIG. 2, illustrating the nose cone during vertical descent after said nose cone has been decoupled from the exoskeleton and following deployment of one or more safety parachutes.

Turning now to FIG. 6, nose cone 201 including cockpit cabin 202 is shown suspended beneath one or multiple deployed parachutes 601, as if following a catastrophic event that triggered the separation of such nose cone 201. In such an event, coincident with nose cone 201 breaking away from exoskeleton 203 by separating at junction points 204, as more particularly described with respect to FIG. 2, above, said one or more parachutes 601 are mechanically or explosively ejected using known techniques from one or multiple holding compartments 602. The corresponding holding compartment cap or caps 603 are forced off and discarded by the force of such release, and the one or more parachutes 601 deploy, open and are filled with air based on well-known principles to the full extent of shroud lines 604, which are connected to risers 605 that are in turn securely attached to said nose cone 201. It will be understood by persons of ordinary skill in the art that the use of such one or multiple parachutes 601 will increase the odds that cockpit cabin 202 occupants will survive a catastrophic event by reducing the speed of descent of nose cone 201, and its force of impact. In an alternative embodiment, a parafoil is used in place of the one or multiple parachutes 601, and preferably is able to be manually or autonomously used to maneuver the descent profile of nose cone 201 to result in a soft landing by directly or indirectly pulling on risers 605. In addition, in a preferred embodiment, a distress call including the GPS coordinates and a tracking signal will automatically be sent and nose cone 201 is equipped with an inflatable raft and emergency provisions (not shown) that, in the event such catastrophic event occurs over water or in a remote area, will manually or automatically be deployed for the protection of said crew members until emergency assistance arrives.

Figure 7A:
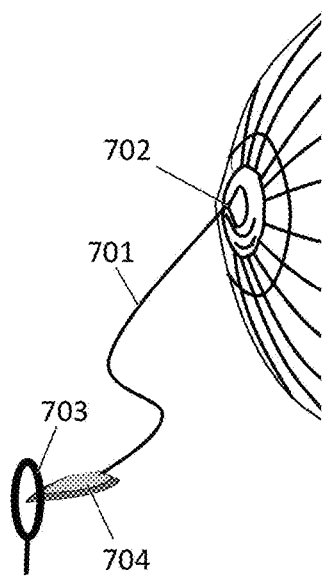
FIG. 7(a) depicts the prior art for locating and tethering an airship at a landing site.

Turning next to FIG. 7(a), which depicts the prior art in locating and docking a lighter-than-air airship. As disclosed in Applicant's earlier disclosures that matured into the previous '810 patent, one of the historical challenges of operating an airship has been to control the airship's landing, particularly in situations when the landing site is tight and/or where weather conditions such as high winds in or near the landing area make it difficult to control a craft having such a large footprint. In order to address such challenges, Applicant previously disclosed use of a lightweight guide-wire cable 701 physically attached to connector 702 at an appropriate point at or near the front of said airship.

As previously disclosed by Applicant, a pole or mast that is taller than at least half the diameter of the airship can be equipped with a gimble on its top that can swivel to any angle. In said prior art, Applicant disclosed that attachment point 703 can be mechanically coupled to this gimble, thereby enabling an airship securely tethered to such pole or mast to move 360° around said anchor point with the airship being allowed to reorient itself so that its nose 702 points into the oncoming wind.

Applicant previously disclosed that guide-wire cable 701 may locate attachment 703 by firing a projectile connected to the end of guide-wire 701 into a receiving port that can optionally be equipped with an electromagnetic field, or through use of a drone 704 that may be piloted from a remote console by the airship's pilot or a landing officer. While the foregoing means of locating the anchor point, tethering and docking an airship may be employed with respect to airship 201 of the subject disclosure, FIG. 7(b) illustrates an improved method of docking and securely anchoring the craft that may enable the airship to land on even smaller sites irrespective of high wind conditions.

Figure 7B:
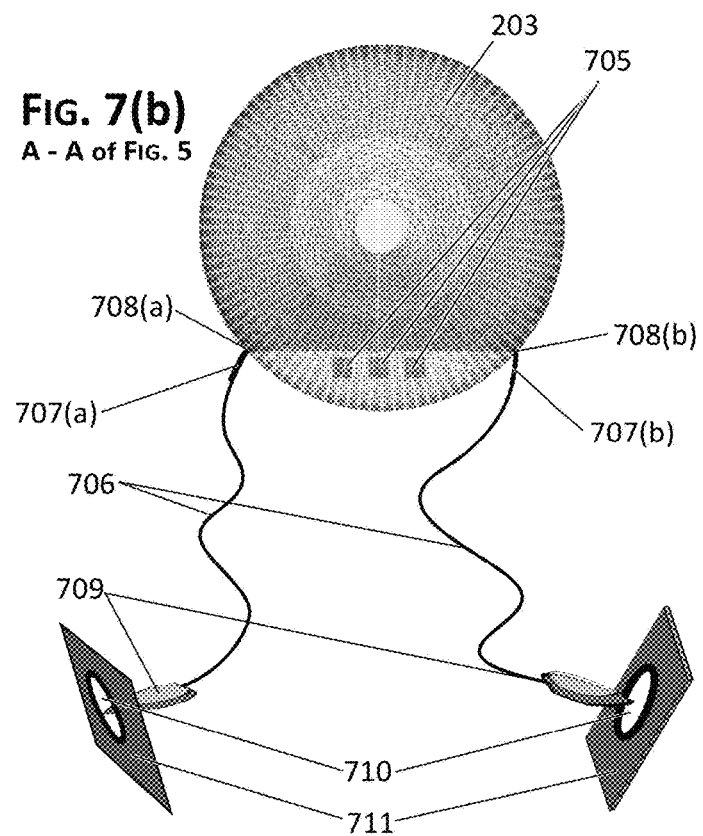
FIG. 7(b) depicts an alternative method of directing an airship to a landing location and tethering said airship to two or more anchor points in accordance with the principles of the subject disclosure.

FIG. 7(b) depicts the cross-sectional view of exoskeleton 203 designated as Section A-A in FIG. 5(a) and shows multiple containers 705 in the cargo area of said lighter-than-air airship. Such containers 705 generally contain payload and, in one optional embodiment may include pre-filled high-pressure tanks for compressed gasses such the Titan® ISO container module manufactured by Hexagon Lincoln and/or liquid storage tanks in an interchangeable configuration for transit of hydrogen as described in Applicant's '802 patent and/or to enable use of the fuel that is best suited for the planned operational mission. In one preferred embodiment, two or more lightweight guide-wire cables 706 are physically attached to larger diameter tie-down cables 707(a) and 707(b), which heavier tie-down cables in turn physically attach to exoskeleton 203 at attachment points 708(a) and 708(b). At the opposite end of each said lightweight guide-wire cable 706, a pilot locator 709 is directed to its corresponding anchor point 710 on walls 711 of a cradle or gantry structure. As depicted, said pilot locators 709 may include any number of locating means including but not limited to a dropped line that is manually retrieved, a fired projectile that is attracted electromagnetically, an autonomous drone that is drawn to a homing beacon and remotely controlled drones. Although depicted in FIG. 7(b) as just two anchor points 710, persons of ordinary skill in the art of operating airships and docking other vessels with large surface areas will readily understand that it may be preferable to have multiple locators 709 and corresponding anchor points 710 along both sides of the airship in order both to better distribute the load exerted on exoskeleton 203 and to selectively control the front, middle and rear of said airship as it is positioned in cradle 711, as hereinafter described.

FIGS. 8(a)-(b) provide additional details regarding said cradle or gantry structure 711 used in one preferred embodiment of the subject technology. FIG. 8(a) illustrates exoskeleton 203 of a lighter-than-air airship 101 being tethered to said cradle 711 by tie-down cables 707(a) and 707(b) pulled through anchor points 710(a) and 710(b) by winches 801(a) and 801(b), respectively. Although cradle 711 may in one embodiment be stationary, in a preferred embodiment cradle 711 is fitted with wheels 802 and track 803 to enable the airship to be moved into and out of a hanger structure, as more particularly described with respect to FIG. 8(b). It will be readily understood by persons of ordinary skill in the art of airship operation that in one preferred embodiment, some lifting gas may be retained in the ballonets of airship 101 to reduce part of the total weight of said airship even when the airship is secured in cradle 711. This will result in something less than the total weight of the airship and its cargo needing to be borne by said cradle 711, thereby permitting the cradle to be moved on tracks 803 by a relatively small tug vehicle or pulley system (not shown).

Cradle 711 may be situated on the surface of land 804 or optionally partially submerged partially (as shown in FIG. 8(a)) or fully therein. Additionally, in one preferred embodiment, cradle 711 optionally may be located on a turntable structure 805, thereby enabling the whole structure to rotate on wheels 806 along circular track 807, or other well-known means for turning such a structure. As shown in FIG. 8(a), when airship is properly tethered and aligned, gangway 808 may be extended by rollers 809 or their equivalent through cargo bay doors into the cargo area of the airship, enabling cargo 705 to be loaded or unloaded while the airship is securely moored. Although such rollers 809 are shown in FIG. 8(a) as being below gangway 808 as an integral part of cradle 711, in one alternative embodiment, such rollers 809 also may be strategically positioned both above and below gangway 808 as part of cradle 711, optional turntable structure 805, the permanent land-side 804 installation, and inside the cargo hold of airship 101 itself, thereby resulting in such gangway 808 to provide an additional physical hold-down of said airship until the lifting gas in the ballonets is reduced as more particularly described in Applicant's previous patent disclosures.

Persons of ordinary skill in the art of airship operation will understand that one of the longstanding challenges associated with lighter-than-air airships being used to transport large quantities of freight is the so called "loft ballast" logistics problem. This problem may be understood by the example of 40 or 50 tons of payload being removed from an airship, thereby instantly making the airship 40 or 50 tons lighter and, absent mitigation, causing the airship to ascend very rapidly. The foregoing combination of tethering the airship in cradle 711 and use of gangway 808 until the release or recompression of lifting gas (as disclosed in Applicant's earlier '810 patent) compensates for such change in cargo loading. Resolution of this long-standing technical problem will help to make logistics airships commercially viable by enabling the rapid and safe loading and removal of cargo.

FIG. 8(b) illustrates how optional turntable 805 assists in addressing higher wind conditions. Wind symbol 810 indicates, by way of illustrating the principles of the subject technology, the wind blowing from the southwest at a speed of 75 knots. In response, as illustrated by arrow 811, turntable 805 is rotated so that nose 103 of lighter-than-air airship 101 is pointed into the wind to assist in safely landing the airship and to minimize the effect of the wind on such a large craft. Once the airship is securely tethered to cradle 711 as described with respect to FIG. 8(a), turntable 805 then may be rotated in the direction of turning arrow 811 so that cradle track 803 on said turntable aligns with track 803 on land 804. Then, cradle 711 (with airship 101 moored to it) may be moved into hanger structure 812, and one or more gangways 808 can be extended from or into the airship's cargo area. The foregoing steps may be undertaken in reverse to enable the airship to safely takeoff in winds that are too high if such nose 103 is not turned directly into the wind.

The following table summarizes the acreage required for various optional landing conditions to support a lighter-than-air airship assumed to be 1000' in length and 150' in diameter, and assuming a 20% margin for operational safety when subject to wind movement and a 10% margin when protected from it:

For example, a user may order an item and specify that it should be delivered to their personal residence or office. Generally speaking, a period of months earlier, the item was manufactured and/or assembled in a different region, country or (frequently) even on a different continent; and shipped by boat, train and/or truck to a regional warehouse facility. When the order for the item is received, it may be picked up from that warehouse facility, packed and shipped to the customer for final delivery by a shipping carrier. Generally speaking, that shipping carrier will load the item onto a truck that is driven by a human to an airport where it is shipped to a distribution hub, sorted, and driven on another truck to an airport where it is taken to the nearest local distribution center, placed on yet another truck that transports it to the final delivery location and the human driver, or another human companion with the driver, will retrieve the item from the truck and complete the delivery to the destination. For example, the human may hand the item to a recipient, leave the item outside the user's front door, or place it in a predesignated collection spot such as a post office box or mail room.

Figure 9A:
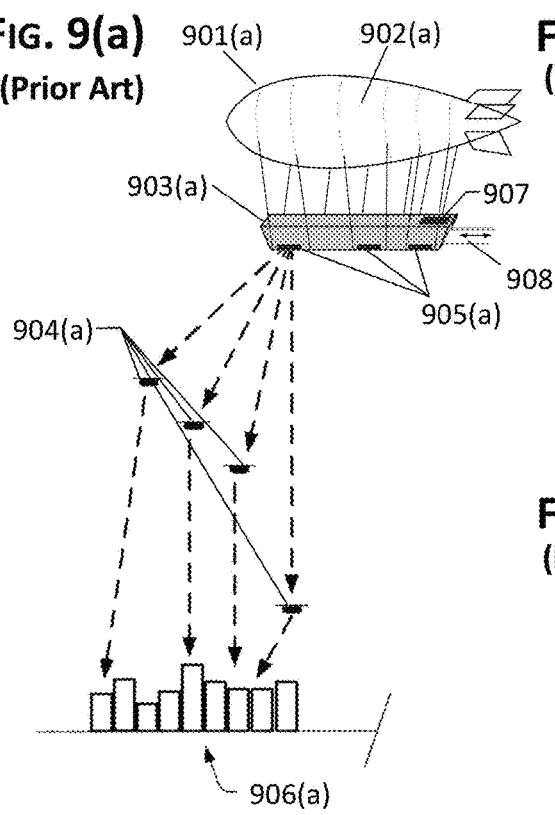

With the increase in online purchasing, the speed, convenience and cost of local delivery is frequently an important consideration in selection of merchants and goods by the consumer. Generally speaking, these methods have focused on making improvements in the "last mile"; and in the case of such state-of-art proposals, the UAV may receive inventory information and a destination location, autonomously retrieve the inventory from a location within the airship, compute a route to the destination, and autonomously travel to that destination to deliver the goods. Upon completion of the delivery, the UAV may return to the airship, a shuttle replacement location including another lighter-than-air airship, a nearby materials handling facility, or another location to be recharged and receive goods for the next delivery FIG. 9(a) illustrates such a service as disclosed in Amazon Technologies' '280 patent entitled "Airborne fulfillment center utilizing unmanned aerial vehicles for item delivery". As shown therein, the lighter-than-air airship 901(a), referred to in the '280 patent as an aerial fulfilment center or AFC, is comprised of a lifting portion 902(a) that includes the lighter than air gas, and a separate fulfillment center

| Landing Condition | Outdoor Area | Hanger Area | Comments |
| --- | --- | --- | --- |
| Single-point anchor, no gimble or turntable | 1200' x 180' 5.0 acres | 1100' x 165' 4.2 acres | Limited to operating in light or no wind conditions |
| Single-point anchor, with 360° swivel of the airship | 1200' radius 103.9 acres | 1100' x 165' 4.2 acres | Large land requirement, suited to higher winds but needs low or no wind to move ship in/out of hanger |
| Cradle and turntable as illustrated in FIG. 8(b) | 1100' diameter 21.8 acres | 1100' x 165' 4.2 acres | Less land required, still suited to higher winds and able to move immediately |

Figure 9B:
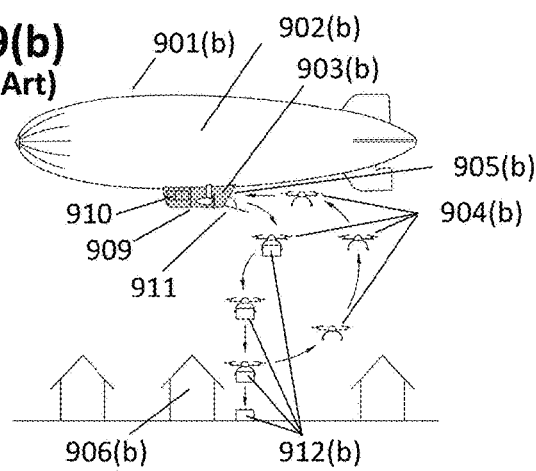
Figure 9C:
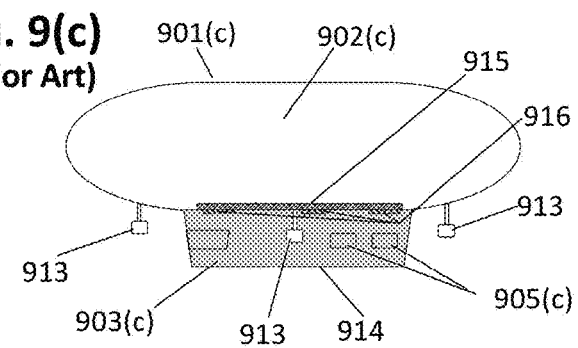

Turning next to FIGS. 9(a)-(c), three sub-parts illustrate the current state of the art concerning use of a lighter-than-air airship as an aerial warehouse or transportation means for small packages and cargo to a particular area, and as a launchpad for unmanned aerial vehicles (or "UAV") to deliver such goods to purchasers. Persons of ordinary skill will understand that the final, or last mile delivery of physical items to a home, office or other user-specified location is traditionally accomplished using a human controlled automobile, truck, bicycle, cart, or the like.

903(a) that is used to store inventory, deploy UAVs, etc. and which is shaded for emphasis in FIG. 9(a). According to its written specification, the fulfilment center 903(a) may be coupled with lifting portion 902(a) using a variety of techniques, including as illustrated in FIG. 9(a) (which is a composite of FIGS. 3 and 4 of said '280 patent), fulfillment center 903(a) may be suspended using cables from lifting portion 902(a) of the AFC 901(a), and in other implementations, fulfillment center 903(a) may be directly mounted to or incorporated with the lifting portion 902(a).

UAVs 904(a) depart from one or more UAV deployment bays 905(a) and, based on flight instructions and/or wireless communications and using wings and/or propellers as more particularly described in said '280 patent, such UAVs 904(a) navigate to the user specified delivery location within a metropolitan area 906(a). Although not shown in FIG. 9(a), the '280 patent specification discloses that upon completion of their respective item deliveries, such UAVs 904(a) may be incorporated into a UAV network to deliver other items or instructed to navigate to a materials handling facility, shuttle replenishment or other location from which UAVs 904(a) may be returned to the AFC 901(a) via a shuttle that utilizes one or more docking bays 907 or docking arm 908 that may be extended from the AFC 901(a) and docked or mated to said shuttles to facilitate the transfer of inbound and outbound items.

FIG. 9(b) shows another delivery service as anticipated in U.S. patent application Ser. No. 14/817,356, entitled "Method of drone delivery using aircraft", filed by Gerald Fandetti on Aug. 4, 2015 (the '356 application) and subsequently abandoned. This service employs a lighter-than-air airship 901(b) such as a blimp or Zeppelin that is comprised of a lifting portion 902(b) that includes the lighter-than-air gas, and a separate control gondola 909, including cockpit 910, in which users may fly the airship, and cargo area 903(b), which is shaded for emphasis in FIG. 9(b). Control gondola 909 may include a pivoting door 911 that may open and close, thereby providing UAVs 904(b) with an exit from cargo area 903(b) during the releasing and retrieval step.

As described in the '356 application, cargo area 903(b) may be loaded with a plurality of packages 912(b) prior to airship 901(b) taking off from the ground. Airship 901(b) may fly to a plurality of different locations, each being in close proximity to one or more delivery destinations such as homes or businesses 906(b). Once airship 901(b) has reached a first location, cargo door 911 may pivot open and a plurality of UAVs 904(b) may be released from cargo area 903(b). Airship 901(b) may remain in the location for a period of time to deliver all packages to destinations in that area and retrieve UAVs 904(b) once such deliveries have been completed. Each UAV 904(b) may be directed to a different delivery destination, where it releases package 912(b). UAV 904(b) may then be directed back into cargo area 903(b) through opened pivot door 911, and airship 901(b) may fly to the next location in which the above steps are repeated.

FIG. 9(c) shows yet a third delivery service as anticipated in Walmart Apollo's '402 patent, entitled "Gas-filled carrier aircrafts and methods of dispersing unmanned aircraft systems in delivering products". This service employs a gas filled aerial transport and launch system 901(c) that is comprised of a gas chamber and/or sub-chambers 902(c) filled with heated gas, helium, other relevant gas, or a combination of two or more such gases that induces a lifting force on carrier compartment 903(c), which is shaded for emphasis in FIG. 9(c).

According to the '402 patent specification, one or more propulsion systems 913 are secured with the gas chamber 902(c) and/or the carrier compartment 903(c). Carrier compartment 903(c) includes an unmanned aircraft system (UAS) storage area configured to receive multiple UASs 904(c) (not shown) staged to be launched in delivering products. One or more UAS launching bays 905(c) are included in the carrier compartment 903(c), or in the floor 914 thereof, to enable UASs 904(c) to be launched in a variety of ways while transport aircraft 901(c) is in flight and while UASs are carrying a product or package to be delivered to an intended corresponding delivery location that is within a UAS flight threshold from a location of the transport aircraft at the time the UAS 904(c) is launched. The launching bay 905(c) doors may further be utilized in the retrieval of UASs 904(c) returning from a delivery.

In some embodiments of the '402 patent, carrier compartment 903(c) may be removably coupled with gas chamber 902(c) so that carrier compartment 903(c) can be readily detached and reattached. The ability to decouple carrier compartment 903(c) from gas chamber 902(c) enables a carrier compartment preloaded with UASs 904(c) and/or packages to be readily coupled with a gas chamber, and subsequently decoupled when the packages are delivered and when power levels and/or fuel are below a threshold, or other such reason. Upon decoupling of a first carrier compartment 903(c), a different preloaded carrier compartment 903(c) with charged power sources can be coupled to gas chamber 902(c) allowing transport airship 901(c) to quickly return to the sky and continue enabling packages to be delivered. In some embodiments, gas chamber 902(c) includes one or more carrier mountings 915 that are configured to securely couple with one or more coupling systems 916 of carrier compartment 903(c). In some instances, said carrier mountings 915 and coupling systems 916 can include connections such that, when coupled, electrical power and/or communications may be transferred between the gas chamber 902(c), propulsion system 913, and/or the carrier compartment 903(c).

As illustrated by the shaded areas shown in FIGS. 9(a)-(c) and as summarized in the foregoing discussion, all systems of the prior art incorporate the carrier for such unmanned aerial vehicles and the packages to be delivered by them from a gondola or other appendage to the airship, thereby decreasing the aeronautical efficiency of said airship, reducing its cruising speed and increasing the energy requirements. In one preferred embodiment of the subject technology, these problems are overcome by locating the cargo area inside exoskeleton 203 of airship 101 rather than appending a separate structure such as fulfillment center 903(a), cargo area 903(b), or carrier compartment 903(c) of the prior art.

Turning finally to FIGS. 10(a)-(b), which consists of two sub-parts: FIG. 10(a) corresponding to Section B-B from FIG. 5(a); and FIG. 10(b) corresponding to Section A-A from FIG. 5(a). As illustrated in FIGS. 10(a)-(b), rather than being appended to airship 101, the cargo area in the improved airship design is located within exoskeleton 203. As more particularly described in Applicant's '969 patent, in one preferred embodiment, goods may be stored in intermodal (ISO) shipping containers 705 that are commonly used for shipping freight by ship, train and truck; and in one embodiment may be hung from a rail located in the lower approximately 15% of airship 101. Such standard ISO shipping containers 705 are traditionally 10', 20' or 40' long; 8'0" wide and 8'6" tall. In other embodiments, however, different bulk shipping containers (including containers made from lighter weight materials such as composite plastics and fabrics) and irregular shaped and over-sized payload such as parts for windmills, airline and spacecraft assemblies, bulk automobile deliveries, and electrolyzer and fuel cell units, etc. may be carried and optionally may be stored on an installed floor of airship 101, approximately 10' to 12' below the above-referenced overhead rack. Accordingly, as shown in FIGS. 10(a)-(b), payload 1001 collectively incorporates standard shipping containers 705 and any such alternative payload. Persons of ordinary skill in the art of warehouse management will readily understand that, to the extent the systems for moving such payload 1001 are not fully automated, such floor area may also be used for the movement of warehouse and shipping personnel and equipment.

In one preferred embodiment, one or multiple panels 1002 built of a portion or all of selected one or multiple triangles comprising exoskeleton 203 and skin 406 adjacent to said cargo storage area are able to open and close in support of direct to end-point pick-up and delivery services, as more particularly described below. In such case, said one or multiple selected panels 1002 may, in response to a manual or pre-programmed command or proximity switch, temporarily swing open as illustrated in FIG. 10(*a*), slide or otherwise move to an open position to enable one or more unmanned aerial vehicles (UAVs) 1003 to fly out of said opening. In an alternative embodiment, one or multiple flight decks may be located in a designated area such as at the rear of said interior cargo space and serve as a central point for launching UAVs 1003 from airship 101. As such term is used in the following disclosure, such UAVs 1003 may be any unmanned fixed wing, single or multi-rotor aircraft, UAS, drone or the like. While it may be powered by any fuel, in one preferred embodiment, UAVs 1003 are powered by compressed or liquid hydrogen in order to extend their duration of service, maximize the amount of weight they can carry, minimize the time required in refueling, and to assure minimal to no carbon footprint from such operation.

As illustrated in FIGS. 10(*a*)-(*b*), such UAVs 1003 include clasping arms 1004 to enable said UAVs to securely grip onto and, at the appropriate time, release packages 1005. In an optional embodiment, UAVs 1003 may include retractable cable 1006 to enable the UAVs to remain somewhat out of reach above the intended drop area to help enhance safety when near pets, children, adults and other objects. In yet another optional preferred embodiment, UAVs 1003 include wireless camera 1007, enabling visibility when necessary from display screen 302 in cockpit cabin 202, and with which to provide photo confirmation of such delivery, including an indication of the precise geolocation and timestamp of where and when the goods were left.

In one preferred embodiment, a plurality of packages 1005 may be loaded into shipping containers 1001 and transported by airship 101 directly from a factory or distribution center to one or more areas where multiple delivery destinations such as homes or businesses 1008 are located. The enhanced aerodynamic characteristics of airship 101 enables it to travel at speeds that are substantially faster than traditional airships, making door-to-door overnight delivery from a few regional warehouses and second day door-to-door delivery of goods produced in remote areas such as in Asia, South America or Europe feasible to all parts of the U.S. (and vice versa), without any intermediate stops or multi-modal transfers being required. This ability to rapidly serve end users directly from the factory or a few large regional distribution centers resolves the last-mile challenges and provides a strong competitive advantage.

As indicated by arrow 1009(*a*), once airship 101 has reached a first drop location, one or more panels 1002 (or a flight deck door in the alternative embodiment) opens and one or more UAVs 1003 fly out of the airship 101 carrying goods 1005 intended for destination 1008 served by the position of airship 101. As indicated by arrow 1009(*b*), said UAV 1003 descends rapidly to the immediate area of such destination; whereupon as indicated by arrow 1009(*c*), it proceeds to destination 1008 based on pre-programmed GPS coordinates or other delivery information. In situations where the preferred destination is confusing for some reason once it reaches the immediate area, in an optional preferred embodiment UAV 1003 may be directed in RPV mode from screen 302 using remote controls that are more particularly described with respect to FIG. 3, above.

In one preferred embodiment, as illustrated in FIG. 10(*b*), sentinel beacon 1010 transmitting wireless signal 1011 designates a specific end point such as the preferred drop-off location at destination 1008. Such beacons 1010 may be sold, leased or otherwise provided to customers as an added convenience to designate the desired placement locations for goods 1005, to reinforce customer loyalty, and to ensure timely and accurate deliveries to such destination 1008. Such beacons 1010 may communicate directly with UAVs 1003 or such communication may be directed by re-transmission equipment 1012 mounted in an appropriate position such as the bottom surface of said airship 101, in nose cone 201, or another suitable location.

In an optional preferred embodiment, communications equipment 1012, alone or in coordination with one or more UAVs 1003, also may provide a communications platform for beam form transmission of cellular signals and as a satellite signal relay station. By way of non-limiting example, using beam form technology, such communications equipment 1012 and one or multiple UAVs 1003 may be used to provide communication services to users in underserved cellular areas and in coverage areas affected by an emergency disruption of normal communication services.

In yet another one optional embodiment, communications equipment 1012 may be used as a satellite communications relay platform for providing high-speed Internet, e-mail, telephony, televisual services, games, video on demand, and global positioning systems in large underserved and remote areas. Persons of ordinary skill in the art will appreciate that when dedicated exclusively to such service, the operating systems of airship 101 can be used to cause the ship to remain for extended periods of time in a relatively stationary position that is well within the transmission range for standard mobile phones and wireless internal computer antenna. Such deployment can enable such ground-based units signal access for which satellites are otherwise out of range, provide poor reception and/or result in high transmission latency. Airship 101 can utilize communications equipment 1012 to provide this relay function as an alternative to cube relay sets that must otherwise be launched into low earth orbit by conventional rockets at considerable cost and with a substantial carbon footprint, and the quantity of which are increasingly resulting in space clutter.

Moreover, there exists an opportunity for hybrid usage. Where multiple airships 101 are flying over an area as part of standard air cargo routes and using traditional switching equipment, communications equipment 1012 from one airship 101 may be used for that portion of the time it is over the service area, with its traffic being handed off to communications equipment 1012 on another airship 101 on that route when the first is about to move out of range. These capabilities may be used alone or in concert with the foregoing freight transportation and delivery focus and as a way to assist in defraying a portion of the operating costs of airship 101. Persons of ordinary skill in the art will readily appreciate how this combination of uses will assist in making the services of airship 101 more financially attractive both in carrying freight on the one hand and providing badly needed access to communications capabilities in grossly underserved areas on the other.

Returning now to FIG. 10(*a*), when UAV 1003 reaches the appropriate location for delivering package 1005, it either lands and then releases clasping arms 1004 or alternatively lowers goods 1005 using retractable cable 1006 as indicated by arrow 1009(*d*) before releasing such package. Using optional camera 1007, UAV 1003 can capture an image providing photographic proof of the delivery as previously described, and/or automatically initiate (or trigger initiation of) a call or email message to confirm such delivery details.

In one preferred embodiment, after completing their respective delivery of goods 1005, UAVs 1003 may then be directed away from home or office 1008 as indicated by arrow 1009(*e*), then flying back up to airship 101 as indicated by arrow 1009(*f*) and back into the cargo area as illustrated by arrow 1009(*g*). In one alternative embodiment, some portion or all of UAVs 1003 may be directed to a nearby distribution center, or to another home or office 1008 where a customer has goods they have indicated they wish to return. In this case, UAVs 1003 may pick-up said return package as illustrated by arrow 1013(*d*), then returning to a nearby distribution center or airship 101 as indicated by arrows 1013(*e*) and 1013(*f*), in the latter instance flying back into the cargo area as illustrated by arrow 1013(*g*) through opened one or more panels 1002 or an alternative flight deck, whereupon airship 101 may move to the next drop area, where the above steps are repeated. At the pilots' discretion or based on standard procedures, airship 101 may either hover in essentially the same location while UAVs 1003 perform the foregoing activities, or said airship 101 may slowly move along an optimal route with such UAVs that are programmed to return to the cargo area catching up to it before airship 101 departs for the next drop area.

FIG. 10(*a*) also illustrates one alternative preferred embodiment for use in collecting goods from a number of originating shipper locations. In this alternative embodiment, the foregoing system is applied in the opposite direction. Beacons 1010 at such shipper locations 1008 can be used to alert airship 101 that finished goods or piece works are available for pickup. When airship 101 is over the area, one or multiple panels 1002 open and, as illustrated by arrow 1013(*a*), UAVs 1003 fly out of the cargo area, descending to the area of pickup locations 1008 as indicated by arrow 1013(*b*) and then, as illustrated by arrow 1013(*c*), move to these pickup locations 1008. When directly over the beacons 1010, these UAVs 1003 can optionally use retractable cable 1006 to lower clasping arms 1004 as illustrated by arrow 1013(*d*) to pick up package 1005. Optionally, UAVs 1003 may use video cameras 1007 to confirm such pickup time, geolocation and the weight of parcels 1005 before returning to airship 101 by arrows 1013(*e*), 1013(*f*) and entering cargo area 1013(*g*).

Persons of ordinary skill in the art will appreciate how the foregoing improvements over conventional airship designs permit a number of different modes of operation, each resulting in multiple advantages over the prior art, it being understood that individual circumstances will dictate which of these modes, or selected combinations thereof, may be best suited for the particular situation. While a name may be ascribed to each such mode, this is solely for ease of reference and such names are not intended to be limiting in nature. Also, it is well accepted that a patent applicant has the right to be his or her own lexicographer, and with this in mind the following terms are intended to have the following special meanings in addition to, but not in lieu of their commonly understood meaning to persons of ordinary skill in the art of shipping goods, freight, personnel and other types of payload. In addition to their traditional meaning, as used in the following descriptions, the term "factory" incorporates any and all points of origin of goods or other payload, including for example a manufacturing facility, production plant, farm, mine, personnel base or the like; the term "consumer" includes any and all recipient locations of one or a relatively small quantity of such goods or other payload; and the term "distribution center" includes any and all locations where a shipment of goods or other payload is received and/or from which such goods or payload (alone or in combination with goods or other payload from one or more other sources) are sent to a factory, consumer or another distribution center.

In the direct factory-to-consumer delivery mode, airship 101 picks up goods or other payload directly at a factory, presumably assisted in many cases by its VTOL capability, and delivers such payload directly to consumers by deploying UAVs 1003 as described in FIGS. 10(*a*)-(*b*). In the container pick-up and delivery mode, collection and delivery of goods and other payload by airship 101 are focused around bulk quantities that in one preferred embodiment are packed in standard ISO shipping containers. In this mode, such containers are picked up by airship 101 directly at the factory and delivered directly by said airship 101 to a distribution center or consumer warehouse store location.

In a distribution center-to-end point delivery mode, one or more containers 1001 containing payload 1005 and UAVs 1003 are loaded onto airship 101. In one optional embodiment, each unit of goods 1005 is already paired with a UAV 1003 that will be used to deliver such goods to consumer destination 1008. In another one optional embodiment, when airship 101 arrives to the distribution center rather than using a container such as a standard ISO container, such pre-paired UAVs 1003 may autonomously fly directly onto said airship 101 and take a predesignated location or perch, where they will remain until it reaches the appropriate drop area, where the foregoing described delivery sequence of events ensues. In another one optional embodiment, shipping containers 1001 are filled with goods 1005 to be delivered, the outside face of each such package containing a scannable bar code. UAVs 1003 are either loaded in a separate container 1001 or remain with said airship 101 for successive flights. In this case, UAVs 1003 are programmed to locate packages based on such scannable bar code or alternatively, warehouse automation equipment in the cargo area of airship 101 is programmed to locate the bar code corresponding to the appropriate delivery during flight to the drop area or while over that area, to remove it from the container and expose it for pickup by one of UAVs 1003 to carry out the foregoing described delivery steps. The foregoing modes may be used alone, combined with others or used in different sequences as dictated by the situation, but share the advantage of avoiding traditional intermodal transfers and/or infrastructure such as airports, ports and intermodal distribution centers that are commonly required in the prior art for bulk movement of goods and other payload collection and delivery services.

Persons of ordinary skill will appreciate that various combinations and other alternative operating modes are possible; and may be used interchangeably as dictated by particular needs. It will also be understood that the power system and lift capacity of each UAV 1003 can be optimized for the amount of weight of goods 1005 to be delivered, and significant amounts of mechanical/electrical energy will be avoided since UAVs 1003 will not be required to use their own power to fly from a factory or distribution center to the immediate proximity of consumer destination 1008. It will also be appreciated that while the utility of the subject technology has been described with respect to freight and a commercial application, the technology is well suited to the requirements of other applications, including emergency services and military use cases in deploying or extracting goods and/or individual troops by replacing clasping arms 1004 with a body harness for precisely targeted personnel deployment and/or extraction operations.

By way of further example, another important use of airship 101 is as an operational platform for performing intelligence, surveillance and reconnaissance (ISR) duties for defense, government and private entities with respect to ground and maritime surveillance needs. In one such optional embodiment, communications equipment 1012 may be expanded to include a full mission system including without limitation cameras, radars, automatic identification system (AIS), electronic support measures (ESM) location trackers, active electronically scanned array (AESA) antenna, electro-optical and infrared systems, and other state-of-art equipment for ISR purposes. In one such optional embodiment, additional lifting gas may be used in combination with a lower payload weight to enable airship 101 to fly at significantly higher altitudes and with make-up hydrogen supporting extended deployments being produced through electrolysis using power provided by solar panels 102 as described in Applicant's previously issued '340 patent.

Persons of ordinary skill in the art of advanced military and laser warfare will understand that in one optional embodiment, such a high-altitude platform affording the foregoing ISR capabilities may also be equipped with powerful lasers, neutral particle beam and other directed energy systems with which to readily identify and neutralize an emergent threat posed by the launch of a ground, space or maritime-based missile by an adversary, or to defeat pirate attacks on commercial maritime vessels. Such deployments can occur without concerns about such uses violating any existing or future treaties that prohibit placing weapons in outer space. Moreover, in yet another optional embodiment, such ISR capabilities may be enhanced by using any one or more UAVs 1003 coupled with communication equipment 1012, for close-up confirmation and observation, underwater reconnaissance, search-and-rescue, border surveillance, pipeline oversight and immigration control missions, and for high-precision deployment of life rafts, smoke markers, emergency supplies, explosive charges and illumination flares that cannot otherwise be supported with conventional ISR aircraft or airships of the prior art.

From the foregoing disclosure, it will be appreciated that, although specific implementations have been described herein for purposes of illustration, various modifications may be made without deviating from the spirit and scope of the appending claims and the elements recited therein. In addition, while certain aspects have been presented as optional or preferred embodiments, all such embodiments are not required and thus may be incorporated as dictated by the circumstances to achieve the desired result. Moreover, while certain aspects are presented below in certain claim forms, the inventors contemplate the various aspects in any available claim form. Various modifications and changes may be made as would be obvious to a person skilled in the art having the benefit of this disclosure. It is intended to embrace all such modifications and changes, and accordingly, the above description should be regarded in an illustrative rather than restrictive sense.

What is claimed is:

1. An airship comprising:
   an exoskeleton defined by a plurality of spokes of varying lengths and a plurality of hubs, each spoke coupled, at opposing ends, to one of the hubs, wherein the spokes are connected to the hubs to form isosceles triangles between adjacent spokes; and
   a plurality of couplings, provided on each hub, each coupling attached to an end of a respective spoke such that the respective spoke can be positioned at an angle with respect to the hub.

2. The airship of claim 1, wherein:
   the airship has an elliptical shape;
   the exoskeleton has a plurality of regions including a front region, a rear region, and one or more central regions between the front region and the rear region; and
   a diameter of the front and rear regions is, in each case, less than a diameter of the one or more central regions.

3. The airship of claim 2, wherein each isosceles triangle includes two spokes of a same first length extending lengthwise substantially along a length of the airship and one spoke of a second length different from the first length running lengthwise along a circumference of the airship.

4. The airship of claim 3, wherein the isosceles triangles form rings along the circumference of the airship, the length of the spokes in each ring decreasing in successive rings as the rings become further from a center of the airship and closer to ends of the airship.

5. The airship of claim 4, wherein the length of the spokes in each ring decreases in successive rings by approximately 2 inches as the rings become further from the center and closer to ends of the airship.

6. The airship of claim 4, wherein:
   rings in the one or more central regions comprise a greater number of isosceles triangles formed by spokes than rings in either the front or rear regions.

7. The airship of claim 6, wherein:
   rings in the one or more central regions include a first number of isosceles triangles;
   rings in the front region include a second number of isosceles triangles, where a ratio of the first number to the second number is 4:1;
   rings in the rear region include the second number of isosceles triangles; and
   the exoskeleton has a first intermediate region between the front region and the one or more central regions and a second intermediate region between the rear region and the central region, each of the first and second intermediate regions including a third number of isosceles triangles, where a ratio of the first number to the third number is 2:1.

8. The airship of claim 3, wherein each spoke running lengthwise along a circumference of the airship is connected, via a connection to a hub on opposing ends, to a spoke of the same length running along the circumference of the airship.

9. The airship of claim 1, wherein:
   the spokes are defined by tubular walls, each spoke having an identical diameter and wall thickness,
   wherein each coupling comprises a respective insert disposed within the tubular wall of a corresponding spoke.

10. The airship of claim 9, wherein each coupling further comprises:
    a multi-pronged socket disposed on the hub;
    wherein each insert comprises a protrusion at a first end rotatably connected to the multi-pronged socket.

11. The airship of claim 10, wherein each multi-pronged socket includes three prongs and each protrusion includes two prongs.

12. The airship of claim 1, wherein the spokes are carbon fiber and defined by tubular walls having a wall thickness of substantially 0.125 inches.

13. The airship of claim 1, further comprising:
a skin coupled to the exoskeleton and defining an exterior of the airship,
wherein the skin is defined by curvilinear panels coupled to the hubs using a plurality of connector protrusions.

14. The airship of claim 13, wherein:
each curvilinear panel includes a plurality of connector protrusions;
each hub includes a center opening; and
one or more of said plurality of connector protrusions is seated within one or more of the center openings to couple one of the curvilinear panels to the exoskeleton.

15. The airship of claim 13, wherein:
each curvilinear panel includes a plurality of molded protrusions having a semi-cylindrical shape; and
one or more of said plurality of molded protrusions engages one or more of the spokes to couple one of the curvilinear panels to the exoskeleton.

16. The airship of claim 13, wherein at least one of the curvilinear panels includes a thin film solar collection cell embedded therein.

17. The airship of claim 13, wherein the skin is bonded aramid fiber coated with polytetrafluoroethylene (PTFE).

18. The airship of claim 1, further comprising a nose cone coupled to the exoskeleton to define a front end of the airship.

19. The airship of claim 18, wherein:
the nose cone contains a pilot cabin from which the airship can be controlled; and
the nose cone can be selectively decoupled from the airship.

20. The airship of claim 19, wherein the nose cone is configured to selectively decouple from the airship via explosive bolts that decouple said nose cone from the exoskeleton.

21. The airship of claim 1, wherein:
the exoskeleton of the airship forms an elliptical shape;
the airship includes a pointed front end coupled to the exoskeleton; and
the airship includes a pointed rear end coupled to the exoskeleton.

22. The airship of claim 1, further comprising:
a plurality of cameras positioned to view an exterior environment of the airship from different positions, the cameras configured to generate image data; and
a display screen configured to generate a virtual model of the surrounding environment based on the image data.

23. The airship of claim 13, further comprising a cargo storage area located within the exoskeleton.

24. The airship of claim 23, wherein at least one curvilinear panel is configured to, when in a first orientation, provide a pathway between the cargo storage area and an exterior environment and to seal the pathway between the cargo storage area and an exterior environment when in a second orientation different from the first orientation.

25. The airship of claim 24, further comprising a plurality of unmanned aerial vehicles (UAVs) configured to transport a payload, said payload being at least one of the following: a package or parcel, a person, telecommunications equipment, or remote monitoring equipment.

26. The airship of claim 25, wherein the UAVs are powered by compressed or liquid hydrogen.

27. The airship of claim 25, wherein the UAVs are configured to communicate with a beacon, the beacon designating a destination, to deliver cargo to, or from which to retrieve cargo.

28. The airship of claim 25, wherein at least one of the UAVs includes a camera to capture an image of a package delivery.

29. The airship of claim 25, wherein at least one of the UAVs includes a barcode scanner to scan a barcode on the payload.

30. The airship of claim 1, further comprising communications equipment configured to retransmit a plurality of signals, said plurality of signals comprising at least one of the following: a cellular signal; or a satellite signal.

31. The airship of claim 30, wherein:
the airship is further configured to remain in a relatively stationary position within transmission range of an area; and
the communications equipment is configured to retransmit the plurality of signals to communications devices in the area.

32. The airship of claim 30, wherein the communications equipment includes an operational platform configured to perform intelligence, surveillance, and reconnaissance (ISR) duties.

33. An airship and system for landing the airship comprising:
the airship comprising:
an exoskeleton defined by a plurality of spokes of varying lengths and a plurality of hubs, each spoke coupled, at opposing ends, to one of the hubs, wherein the spokes are connected to the hubs to form isosceles triangles between adjacent spokes; and
a plurality of tie-down cables, each tie-down cable having a first end physically connected to said exoskeleton,
wherein each hub comprises a plurality of couplings provided thereon, each coupling attached to an end of a respective spoke such that the respective spoke can be positioned at an angle with respect to the hub; and
a cradle configured to hold the airship, the cradle having a plurality of anchor points,
wherein each tie-down cable includes a second end, opposite the first end, the second ends configured to attach the tie-down cables to the plurality of anchor points to secure the airship to said cradle.

34. The airship and system for landing the airship of claim 33, wherein:
the airship is further configured with a plurality of guide-wire cables, each such guide-wire cable being connected at one end to a tie-down cable and at the other end to a pilot locator;
wherein the pilot locator is one of the following: a projectile that is attracted electromagnetically to one of the anchor points, an autonomous drone that is drawn to a homing beacon at one of the anchor points, or a remotely controlled drone; and
each guide-wire cable directs the second end of each tie-down cable to one of the anchor points.

35. The airship and system for landing the airship of claim 33, wherein the cradle has wheels and is situated on a track that permits the airship, once secured to said cradle, to be moved.

36. The airship and system for landing the airship of claim 33, wherein the cradle is positioned on a turntable structure, the turntable structure configured to rotate to point the airship in a predetermined direction.

37. The airship and system for landing the airship of claim 36, wherein:
rotation of the turntable structure is automated to account a direction of the wind; and
each tie-down cable is configured to be pulled through its respective anchor point.

38. The airship and system for landing the airship of claim 33, further comprising a gangway configured to extend from or to the airship when the airship is secured to the cradle.

39. The airship and system for landing the airship of claim 38, wherein when the airship is secured to the cradle, the gangway and cradle preclude the airship from ascending.

40. A method of delivering cargo using an airship, the method comprising:
providing the airship, the airship comprising:
an exoskeleton defined by a plurality of spokes of varying lengths and a plurality of hubs, each spoke coupled, at opposing ends, to one of the plurality of hubs, wherein:
each hub comprises a plurality of couplings provided thereon, each coupling attached to an end of a respective spoke such that the respective spoke can be positioned at an angle with respect to the hub; and
the spokes are connected to the hubs to form isosceles triangles between adjacent spokes; and
a cargo storage area located within the exoskeleton;
identifying at least one delivery destination; and
delivering the cargo to the at least one destination.

41. The method of claim 40, wherein:
the airship further comprises a plurality of tie-down cables, each tie-down cable having a first end connected to the exoskeleton; and
the method further comprises:
providing a cradle, the cradle comprising a plurality of anchor points configured to connect to the tie-down cables to secure the airship;
causing the airship to descend into the cradle by releasing or re-compressing lifting gas;
securing a second end of the tie down cables to anchor points, the second ends being opposite respective first ends;
removing cargo from the storage area; and
loading cargo into the storage area.

42. The method of claim 41, further comprising:
providing a turntable platform configured to hold both the cradle and the airship; and
prior to causing the airship to descend into the cradle, rotating the turntable platform so that the cradle is oriented to point in a predetermined direction.

43. The method of claim 40, wherein:
the airship includes a display screen and a control unit configured to control the airship;
the control unit controls the airship based, at least in part, on algorithms accounting for operating conditions, including one or more of the following:
a compression, release, or recompression of lifting gas;
an amount of thrust and orientation of engines of the airship; and
a relative position of the airship to a destination,
wherein the method further includes using the display screen, by a pilot, to deliver commands to the control system to land the airship at the destination;
the control system employs the algorithms to, at least one of:
release or recompress lift gas at a predetermined rate\;
adjust a direction of at least one engine to a predetermined orientation;
adjust the thrust of at least one engine to a predetermined speed; and
communicate with the turntable platform to rotate the turntable platform so the cradle points in a predetermined direction.

44. A method of delivering goods using an airship, the method comprising:
providing the airship, the airship comprising:
an exoskeleton defined by a plurality of spokes of varying lengths and a plurality of hubs, each spoke coupled, at opposing ends, to one of the plurality of hubs, wherein:
each hub comprises a plurality of couplings provided thereon, each coupling attached to an end of a respective spoke such that the respective spoke can be positioned at an angle with respect to the hub;
the spokes are connected to the hubs to form isosceles triangles between adjacent spokes;
a cargo storage area is located within the exoskeleton; and
a plurality of unmanned aerial vehicles (UAVs) is provided and each is configured to transport cargo;
identifying at least one delivery destination; and
delivering, by at least one of the UAVs, cargo to the identified at least one destination.

45. The method of claim 44, wherein the at least one UAV delivers the cargo to the identified at least one destination using a global positioning system.

46. The method of claim 44, wherein:
the airship includes a display screen and a control unit for controlling the UAVs; and
delivering the cargo by the at least one UAV includes controlling the at least one UAV using the display screen and control unit.

47. The method of claim 44, further comprising, after delivering the cargo at the identified at least one destination with the at least one UAV, flying the at least one UVA back to the airship, and docking the at least one UAV within the cargo storage area.

48. The method of claim 44, further comprising, after delivering the cargo at the identified at least one destination with the at least one UAV, flying to a first additional location;
retrieving a package from the first additional location; and
delivering the package to a second additional location.

49. The method of claim 44, further comprising:
opening at least one of the curvilinear panels; and
directing one of the UAVs through the opened at least one curvilinear panel to enter or exit the airship.

50. A method of delivering goods using an airship, the method comprising:
providing the airship, the airship comprising:
an exoskeleton defined by a plurality of spokes of varying lengths and a plurality of hubs, each spoke coupled, at opposing ends, to one of the plurality of hubs, wherein:
each hub comprises a plurality of couplings provided thereon, each coupling attached to an end of a respective spoke such that the respective spoke can be positioned at an angle with respect to the hub;
the spokes are connected to the hubs to form isosceles triangles between adjacent spokes;
a cargo storage area is located within the exoskeleton; and
a plurality of unmanned aerial vehicles (UAVs) is configured to transport cargo;

identifying at least one retrieval destination; and retrieving, by at least one of the UAVs, the goods at the identified at least one retrieval destination.

51. The method of claim 50, further comprising:

directing the at least one UAV, by a beacon, to the identified at least one retrieval destination.

52. The method of claim 51, wherein the beacon is configured to pulse a signal identifiable by the at least one UAV for directing the at least one UAV.

53. A method of retransmitting wireless signals using an airship, the method comprising:

providing the airship, the airship comprising:

an exoskeleton defined by a plurality of spokes of varying lengths and a plurality of hubs, each spoke coupled, at opposing ends, to one of the plurality of hubs, wherein:

each hub comprises a plurality of couplings provided thereon, each coupling attached to an end of a respective spoke such that the respective spoke can be positioned at an angle with respect to the hub;

the spokes are connected to the hubs to form isosceles triangles between adjacent spokes; and communications equipment configured to retransmit the wireless signals is provided;

positioning the airship within wireless transmission range of at least one area with poor wireless signal coverage; and retransmitting the wireless signals, with the communications equipment, to the at least one area with poor wireless signal coverage.

54. The method of claim 53, further comprising:

providing one or more of the following within the at least one area with poor wireless signal coverage by retransmitting the wireless signals: high-speed Internet; telephone services; televisual services; and global positioning systems services.

55. The method of claim 53, further comprising:

setting a travel route for the airship;

identifying the at least one area with poor wireless signal coverage within the set travel route; and retransmitting the wireless signals when the airship is within wireless transmission range of the at least one area with poor wireless signal coverage identified within the set travel route.

56. The method of claim 53, further comprising:

as the airship leaves wireless transmission range of the at least one area with poor wireless signal coverage, identifying a second airship approaching wireless transmission range of said at least one area with poor wireless signal coverage; and after the second airship is within wireless transmission range of said at least one area with poor wireless signal coverage, retransmitting the wireless signals with the second airship.

57. The method of claim 53, further comprising:

providing a plurality of unmanned aerial vehicles (UAVs) configured to transport cargo and to retransmit the wireless signals; and retransmitting, by at least one of the UAVs, the wireless signals within the at least one area with poor wireless signal coverage.

* * * * *